United States Patent
Snodgrass et al.

(10) Patent No.: US 8,285,589 B2
(45) Date of Patent: *Oct. 9, 2012

(54) REFERRING-SITE BASED RECOMMENDATIONS

(75) Inventors: Ryan J. Snodgrass, Kirkland, WA (US); Michael McDaniel, Seattle, WA (US)

(73) Assignee: Amazon.com, Inc., Seattle, WA (US)

(*) Notice: Subject to any disclaimer, the term of this patent is extended or adjusted under 35 U.S.C. 154(b) by 271 days.

This patent is subject to a terminal disclaimer.

(21) Appl. No.: 12/714,052

(22) Filed: Feb. 26, 2010

(65) Prior Publication Data

US 2010/0161400 A1    Jun. 24, 2010

Related U.S. Application Data

(63) Continuation of application No. 09/876,611, filed on Jun. 7, 2001, now Pat. No. 7,827,055.

(51) Int. Cl.
*G06Q 30/00* (2012.01)

(52) U.S. Cl. ............... 705/14.23; 705/14.16; 705/14.25; 705/14.41; 705/14.49; 705/26.41; 705/26.7

(58) Field of Classification Search ............. 705/14, 705/26

See application file for complete search history.

(56) References Cited

U.S. PATENT DOCUMENTS

| | | | | |
|---|---|---|---|---|
| 5,848,396 A | * | 12/1998 | Gerace | 705/7.33 |
| 5,948,061 A | | 9/1999 | Merriman et al. | |
| 6,016,504 A | | 1/2000 | Arnold et al. | |
| 6,029,141 A | * | 2/2000 | Bezos et al. | 705/27.1 |
| 6,064,980 A | * | 5/2000 | Jacobi et al. | 705/26.7 |
| 6,141,666 A | | 10/2000 | Tobin | |
| 6,307,965 B1 | * | 10/2001 | Aggarwal et al. | 382/225 |
| 6,321,221 B1 | | 11/2001 | Bieganski | |
| 6,356,879 B2 | * | 3/2002 | Aggarwal et al. | 705/26.62 |
| 6,460,036 B1 | | 10/2002 | Herz | |
| 6,460,072 B1 | | 10/2002 | Arnold et al. | |
| 6,963,850 B1 | | 11/2005 | Bezos et al. | |
| 7,571,121 B2 | | 8/2009 | Bezos et al. | |
| 2001/0014868 A1 | | 8/2001 | Herz et al. | |
| 2002/0120567 A1 | | 8/2002 | Caplan et al. | |

FOREIGN PATENT DOCUMENTS

| | | |
|---|---|---|
| WO | 9945487 A1 | 9/1999 |
| WO | 0017792 A1 | 3/2000 |
| WO | 0062223 A1 | 10/2000 |
| WO | 0125947 A1 | 4/2001 |

OTHER PUBLICATIONS

Zaiane et al. ,"Discovering Web Access Patterns and Trends by Applying OLAP and Data Mining Technology on Web Logs", Apr. 22-24, 1998, Proceedings of the Advances in Digital Libraries Conference, p. 19.*

(Continued)

*Primary Examiner* — John Van Bramer
(74) *Attorney, Agent, or Firm* — Knobbe, Martens, Olson & Bear LLP

(57) ABSTRACT

Systems and methods are disclosed for analyzing actions performed by users referred to a target site from particular referring sites or groups thereof, and for using the results of such analyses to select particular items to recommend to users. The referring sites may, for example, be affiliate sites that refer users to a merchant site in accordance with an affiliate marketing program.

20 Claims, 14 Drawing Sheets

OTHER PUBLICATIONS

Press Release titled Amazon.com Introduces "Purchase Circles(TM)," Featuring Thousands of Bestsellers Lists for Hometowns, Workplaces, Universities, and More, dated Aug. 20, 1999 (note: details of an algorithm used to implement the Purchase Circles feature, as made available on the Amazon.com web site in Aug. 1999, are described in the appendix of WO 00/62223).

PR Newswire titled "Linkshare launches affiliates profiling software," Dialog File 813 AN 1232636, dated Feb. 24, 1998.

Schafer, et al., "E-Commerce Recommendation Applications," Data Mining and Knowledge Discovery, vol. 5, Nos. 1-2, dated Jan. 2001, pp. 115-153.

J. B. Schafer, J. Konstan and J. Riedl, "Recommender Systems in E-Commerce," ACM Conference, Electronic Commerce (EC-99), Denver, CO, dated Nov. 1999, pp. 158-166.

Zaiane, et al., "Discovering Web Access Patterns and Trends by Applying OLAP and Data Mining Technology on Web Logs," Proceedings of the Advances in Digital Libraries Conference, dated Apr. 22-24, 1998, p. 19.

\* cited by examiner

REFERRING-SITE BASED RECOMMENDATIONS

PRIORITY CLAIM

This application is a continuation of U.S. application Ser. No. 09/876,611, filed Jun. 7, 2001, now U.S. Pat. No. 7,827,055 the disclosure of which is hereby incorporated by reference

FIELD OF THE INVENTION

This invention relates to data processing and information filtering. More specifically, this invention relates to methods for identifying users that have common interests, and for generating and displaying information relevant to the interests of such users.

BACKGROUND OF THE INVENTION

With the increasing popularity of the Internet and the World Wide Web, it has become common for merchants to set up web sites for marketing and selling goods. One example merchant web site is an online store wherein customers may access and place orders from an online catalog that includes millions of products, such as, books, music, DVDs, toys, games, as well as a variety of other products and product groups. Customers may visit a merchant web site using a variety of methods, such as by directly accessing the web site or through interaction with a web site of one of the merchant's associates.

Some merchant web sites provide programs in which other entities, commonly referred to as "affiliates" or "associates," refer customers to the merchant's web site—typically in exchange for bounty payments or commissions on resulting sales. Typically, each affiliate sets up a web site having one or more links ("referral links") to the merchant's web site, although the referral links may alternatively be distributed by email or using any other suitable technology. The URL portion of each such link typically includes an affiliate identifier that allows the referring affiliate to be identified by the merchant, or by a third party program administrator, when a referral link is followed by a user. In some cases, the affiliates host the referral links together with descriptions, reviews, and/or recommendations of specific products or product groups, in which case the referral links may point to such products or product groups within the merchant's online catalog. In other cases, the referral links are simply in the form of advertisements, such as banner ads, that typically point to the merchant site's home page. For more information about affiliate programs, see U.S. Pat. No. 6,029,141 entitled "INTERNET-BASED CUSTOMER REFERRAL SYSTEM," the disclosure of which is hereby incorporated by reference. In some cases, the tasks of setting up and administering affiliate programs are performed in-whole or in-part by a third party service provider or program administrator, rather than the merchant.

In addition, merchants commonly provide services on their web site for assisting customers in browsing an online catalog and purchasing various products from the catalog. Such services may be invaluable to an online customer, particularly if the customer does not have an opportunity to physically inspect the merchants' products or to talk with a salesperson. One type of service involves automatically generated lists of the best selling or most popular items within a specific community or interest group. The communities may be formed based on information about registered customers of the merchant web site, such as, email address, shipping address, and so forth. For example, it is known to automatically generate and display lists of the top selling items among customers of a particular email domain, such as "NASA.GOV," or to customers within a particular zip code. These lists may be displayed to members of these "communities," and may also be made available for general viewing by the public.

While email-based communities and shipping-address-based communities offer some ways to provide targeted recommendations and content, such groupings are limited and may not adequately direct customers to relevant information. Furthermore, such groupings do not provide much guidance for unrecognized or unregistered customers.

The present invention comprises a method for selecting items to recommend to users. The method comprises tracking referrals of users from each of a plurality of referring sites to a target site, the referrals resulting from user selections of links provided on the referring sites; collecting user activity data regarding item-specific user actions performed on the target site, said item-specific user actions reflective of user preferences for particular items represented on the target site; and selecting, by execution of code by a computer system, a subset of the items to recommend to users of a first referring site of the plurality of referring sites. The task of selecting the subset of items may comprise analyzing the collected user activity data, in conjunction with data regarding the tracked referrals, to identify items that are more popular among users referred from the first referring site than among a general user population of the target site. The referring sites may, for example, be affiliate sites that participate in an affiliate marketing program of a merchant or merchant site, in which case the merchant site may serve as the target site.

SUMMARY

In accordance with one embodiment of the present invention, customers who are electronically referred to a merchant's web site from an affiliate web site, or from one of a group of related affiliate web sites, are automatically assigned to the same "affiliate-based" community. For example, all users who enter the merchant's web site from links on golf-related affiliate web sites may be assigned to the community "golf." Customers having common interests are thereby identified. In some embodiments, users are assigned to specific affiliate-based communities based on other criteria, and/or are permitted to explicitly join one or more affiliate-based communities.

In one embodiment, purchase histories and/or other sets of activity data of the merchant's customers are analyzed periodically to identify specific products or other items that are currently "popular" (e.g., best selling) within an affiliate-community, based upon predefined popularity criteria. This information is provided to members of the community, and possibly to other customers, on the merchant's web site and/or on the web sites of the corresponding affiliates. For instance, when a customer first enters the merchant web site from an affiliate web site, a list may be displayed, wherein the list includes information about the merchant's products that are currently the most popular among users of that affiliate web site or among members of an associated community. This list may additionally or alternatively be pushed to and displayed on the affiliate web site.

The present invention also includes a computer implemented method that comprises: receiving, at a server of a target site, a page request from a computing device of an unknown or unrecognized user, the page request resulting from selection by the user of a referral link on a referring site and including an identifier of the referring site; and selecting a set of items to present to the unknown or unrecognized user in response to the page request. The set of items is selected by the server based on the identifier of the referring site, and consists of items that are more popular among users referred from the referring site than among a general user population of the target site, as determined based on a programmatic analysis of actions performed on the target site by users referred from the referring site and by users not referred from the target site.

For purposes of summarizing the invention, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

A general architecture as well as services that implement the various features of the invention will now be described with reference to the drawings of various embodiments. The drawings and the associated descriptions are provided to illustrate embodiments of the invention and not to limit the scope of the invention. Throughout the drawings, reference numbers are reused to indicate correspondence between referenced elements. In addition, the first digit of each reference number indicates the figure in which the element first appears.

DETAILED DESCRIPTION OF THE PREFERRED EMBODIMENTS

I. Overview

The present invention includes systems and methods for analyzing actions performed by users referred to a target site from particular referring sites (such as particular affiliate sites) or groups thereof, and for using the results of such analyses to select particular items to recommend to users.

Figure 1:
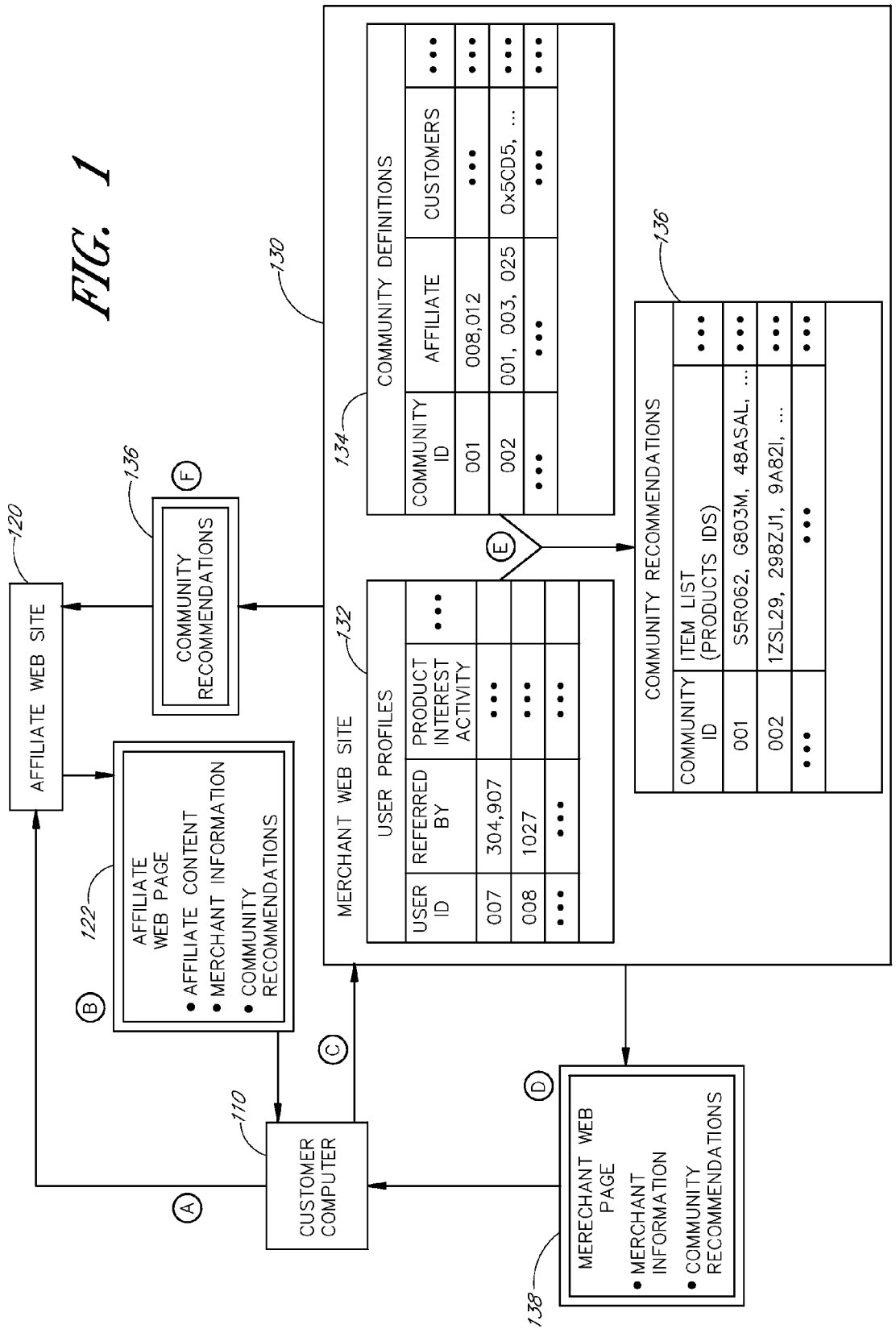
FIG. 1 illustrates one embodiment of a general architecture of an affiliate-based communities system and illustrates the flow of information among components of the system.

FIG. 1 illustrates an example affiliate-based communities system wherein the arrows in FIG. 1 show the general flow of information among components of the system: a customer computer 110, an affiliate web site 120, and a merchant web site 130 which communicate via a communication medium such as the Internet (not shown).

In one embodiment, a customer accesses an affiliate web site 120 (event A) using a standard web browser and is presented with an affiliate web page 122 (event B). The affiliate web page 122 may include content about the affiliate, information about a merchant including one or more "referral" links to the merchant's web site, and community information. The referral link may be in a variety of forms such as a textual link, a banner ad, a graphic image, and so forth. In addition, it is recognized that the referral link may be a link to third party and does not have to be a direct link to the merchant web site. For example, the referral link can point to a third party web site that records the event and then redirects the request to the merchant web site.

The affiliate may also provide information about specific products sold by the merchant that relate to its web site along with referral links to product detail pages of the merchant web site. The customer is able to visit the merchant web site to find more information and/or to purchase the featured products from the merchant. For example, an affiliate that runs a golf school may include in its web site a referral link to a merchant web site that sells golf products, and may include information about and referral links to books for improving golf swings, maps of famous golf courses, as well as popular golf attire.

The customer may then select a referral link to access the merchant web site (event C). As noted above, depending on the referral link, the customer may be presented with a merchant web page 138 (event D), such as, the merchant's home page, an advertisement page, a product detail page, and so forth. After selecting a referral link to a product detail page of the merchant web site, for example, the customer may be presented with additional information about other products that may be of interest to the customer. The additional information may include a list of the merchant's recommended products, best-selling products, a list of on-sale items, and/or products recommended by other customers who have related interests. In addition, the web page 138 may be customized to include community-specific content. The community-specific content may include community recommendations, community highlights, and so forth.

When the customer selects a referral link, the identity of the referring affiliate is sent to the merchant web site. The merchant web site may then record the identity of the referring affiliate in the customer's user profile 132 or other repository. In other embodiments, the merchant web site may record the identity depending on whether the customer subsequently performs some type of activity such as purchasing a product or setting up an account. The merchant web site may also maintain customer-specific histories of the customers' activities. These activities, also referred to as "product interest activity" or "interest activity," may include, for example, purchases, product viewing, shopping cart selection, online bidding submissions, product rating, product downloads, and so forth.

Furthermore, the merchant may also group together one or more affiliates into a community 134. For example, a "Golf Enthusiasts" community may include customers referred by the "Unofficial Tiger Woods Fan Club" affiliate and the "Florida Golf Schools" affiliate. The referring affiliate data for the customers of the web site may then be used to assign customers to affiliate-based communities set up by the merchant. For example, all customers that were referred to the merchant web site by the Florida Golf Schools affiliate may be assigned to the Golf Enthusiasts community. Furthermore, the browsing history data for customers falling within a particular affiliate-based community may be analyzed periodically (event E) to identify lists of items that are popular within or characteristic of the community 136. The lists of items may reflect a variety of recommended items such as hot-selling items and most popular items.

The resulting community-specific recommendations 136 may be displayed in web pages 138 of the merchant site (event D) (e.g., community pages, product detail pages, etc.) and may be sent to affiliate web sites 120 as well (event F).

The merchant web site 130 may also provide various services for enabling users to browse, search, and make purchases from a catalog of several million book, music, DVD, and video titles. In addition, information about existing customers of the web site may be stored in the merchant web site 130 and may include the names, shipping addresses, email addresses, payment information, and product interest activity histories of the customers. Information that is stored for a given customer is commonly referred to as the customer's "user profile" 132.

To facilitate an understanding of one practical application, affiliate-based communities are described primarily in the context of a hypothetical system for assisting customers of a merchant web site 130 in locating and evaluating products within an electronic catalog. The products may include, for example, books, music, DVDs, and videos. It is recognized, however, that the system may be used in other environments such as the marketing and sales of other types of items. For example, in other embodiments, the items that are the subject of the services may be cars sold by an online car dealer, movies titles rented by an online video store, computer programs or informational content electronically downloaded to customer computers 110, or stock and mutual fund shares sold to online investors. Further, it should be understood that the "purchases" referred to herein need not involve an actual transfer of ownership, but may involve leases, licenses, rentals, subscriptions, and other types of business transactions. Purchases may also included non-business transactions that express preferences, such as, for example, customer reviews, customer ratings, customer bids, and so forth.

It is recognized that the "recommended" items may be presented based upon a variety of criteria such as, most popular, best selling, most unique to a community, most up-and-coming, and so forth. Furthermore, the criteria may be based upon factors which illustrate a customer's interest in an item. Items may be recommended based upon how frequently they are viewed, reviewed, rated, purchased, bid, and so forth by members of the community. Furthermore, items may be recommended based upon their inventory, price, profit amount, and so forth. Thus, the present systems and methods use the affiliate-based communities to help assist customers with finding relevant products.

The creation, maintenance, and use of the "affiliate-based communities" will now be described in further detail. The illustrated screen displays, data structures, architectures, and processing methods used to implement the disclosed functions are largely a matter of design choice, and may be varied without departing from the scope of the invention. Accordingly, the scope of the invention is defined only by the appended claims.

II. Affiliate-Based Communities

Communities based upon related affiliates are used to gather information about customers with similar interests. These communities are referred to herein as "affiliate-based communities." The affiliate-based communities may then be used to provide targeted recommendations or other targeted content to members of the affiliate-based communities as well as the general customer population.

The community recommendations service operates generally by tracking purchases of products and/or other customer activity within particular communities. The customer activity may include any activity that evidences a user's interest in a particular item or product ("product interest activity"). The following are examples of types of customer actions that may be included in addition to typical purchase histories.

(1) Placing an item in a personal shopping cart. With this method, products A and B may be treated as similar if a large percentage of those who put A in an online shopping cart also put B in the shopping cart. As with product viewing histories, the shopping cart contents histories or shopping cart selection histories of users may be evaluated on a per session basis (i.e., only consider items placed in the shopping cart during the same session), on a multiple-session basis (e.g., consider the entire shopping cart contents history of each user as a unit), or using another appropriate method (e.g., only consider items that were in the shopping cart at the same time).

(2) Placing a bid on an item in an online auction. With this method, products A and B may be treated as related if a large percentage of those who placed a bid on A also placed a bid on B. The bid histories of user may be evaluated on a per session basis or on a multiple-session basis. The table generated by this process may, for example, be used to recommend related auctions, and/or related retail items, to users who view auction pages.

(3) Placing an item on a wish list. With this method, products A and B may be treated as related if a large percentage of those who placed A on their respective electronic wish lists (or other gift registries) also placed B on their wish lists.

(4) Submitting a favorable review for an item. With this method, products A and B may be treated as related if a large percentage of those favorably reviewed A also favorably reviewed B. A favorable review may be defined as a score that satisfies a particular threshold (e.g., 4 or above on a scale of 1-5).

(5) Purchasing an item as a gift for someone else. With this method, products A and B may be treated as related if a large percentage of those who purchased A as a gift also purchased B as a gift. This could be especially helpful during the holidays to help customers find more appropriate gifts based on the gift(s) they've already bought.

The above examples provide a few of the activities that may be included as part of the product interest activity; it is recognized that other types of activity may also be included.

In one embodiment, customers are automatically assigned to affiliate-based communities based upon their referring affiliates' data, and thus their product interest activity histories are used to create affiliate-based community recommendations. These customers are then considered "members" of the affiliate-based communities.

It is recognized that the affiliate-based communities may be implemented as implicit and/or explicit membership communities wherein members are automatically added to an affiliate-based community based upon their referral data, members are added based upon their affirmative assent to join a community. For example, a customer who visits an affiliate web site 120, but has yet to select a referral link may choose to join the communities associated with the affiliate web site 120, or the customer may be notified of a community that corresponds to an affiliate web site 120 he has visited and is then given the option to join.

In some embodiments, customers may be presented with the recommendations automatically (e.g., based on their referring affiliate data, visiting an affiliate web page, visiting a product detail page of one of the recommended items, etc.) or upon the customer's request (e.g., browsing the "communities" section of the merchant web site 130, signing up to receive community recommendations, etc.). These "presentation" preferences may be stored in the customer's user profile 132.

In one embodiment, the affiliate-based communities may be "composite" communities that are formed as the union of other, smaller communities, herein referred to as sub-communities. For example, there may be a composite community entitled "Golf Enthusiasts" which consists of the sub-communities "Tiger Woods Fans" and "Beginner Golfers." The "Golf Enthusiasts" composite community may include other members from related affiliates and may also include communities that are not affiliate-based communities. Further, it is recognized that a composite community may be a sub-community of another composite community. The composite communities may be defined by system administrators; alternatively, the composite communities may be defined automatically, such as by grouping together communities that have certain keywords in their titles.

In one embodiment, a customer may be a member of a composite community through membership in one of the composite community's sub-communities or through membership in the composite community. For example, in one embodiment, the "Golf Enthusiasts" composite community may include the members of the "Tiger Woods Fans" community and the "Beginner Golfers" community as well as other members. In other embodiments, membership to a composite community may be confined to only those customers who are members of at least one of the sub-communities. The various communities may be arranged within a browse tree, thereby permitting customers to locate and view lists of the recommended items within specific communities. For more information on the browse trees, please refer to the section below entitled "Community Browse Trees."

The customer's community memberships may be recorded within the user profile 132 stored on the merchant web site 130. In addition, community membership information may also be recorded within a cookie on the customer computer 110 reducing the need to access the merchant web site 130 for requests for web pages that are dependent on the user profile 132. One method which may be used to store such information within cookies is described in U.S. patent application Ser. No. 09/494,712, filed Jan. 31, 2000 and entitled "USE OF BROWSER COOKIES TO STORE STRUCTURED DATA," the disclosure of which is hereby incorporated by reference.

By tracking product interest activity of customers within an affiliate-based community, the merchant web site 130 may generate and display lists of the recommended products, such as best selling book titles, to members of the affiliate-based community and possibly other customers. One method that may be used to identify best-selling or popular titles involves monitoring the "velocity" of each product (the rate at which the product moves up a bestsellers list) or the "acceleration" of each product (the rate at which the velocity is changing, or at which sales of the product are increasing over time). In addition, the merchant web site 130 may track products that have become unusually popular within their respective communities, referred to as "hotsellers." One such method that may be used to identify the hotsellers (or for generating community recommendations in general) involves applying an algorithm referred to as the censored chi-square recommendation algorithm to the purchase or other history data of users. The censored chi-square recommendation algorithm is one example of an algorithm that may be used to identify popular products or other items within a community, and is described in the attached appendix, which forms part of the disclosure of the specification.

III. Sample Web Pages

The following provides a brief description of a few sample web pages including an affiliate web page, a product web page, and a merchant's community web pages. It is recognized that a wide variety of web pages and/or other electronic documents may be used and that the sample web pages are meant to illustrate various embodiments of the invention.

A. Affiliate Web Page

Figure 2:
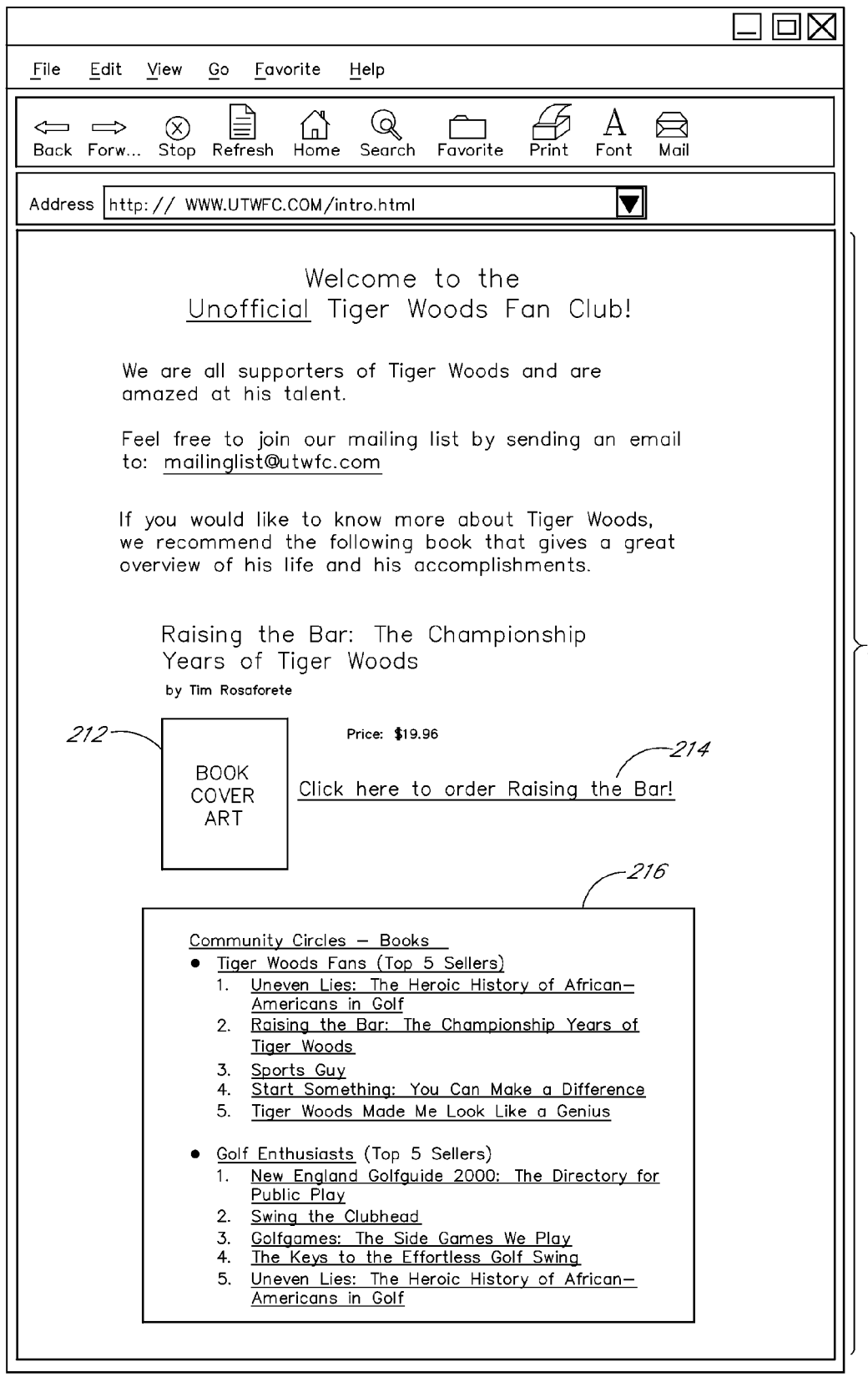
FIG. 2 illustrates one embodiment of an example web page of an affiliate web site.

FIG. 2 illustrates a sample web page of the "Unofficial Tiger Woods Fan Club" affiliate site 210. The exemplary web page 210 includes general information about the affiliate, as well as information about a featured book about Tiger Woods titled "Raising the Bar: The Championship Years of Tiger Woods." The featured book information includes the title and author of the book as well as a brief description and recommendation of the book from the affiliate. In FIG. 2, the graphic icon 212 that is a scaled-down replica of a book cover. The web page 210 also includes a referral link in the form of a textual hyperlink 214 which, when selected, takes the customer to the merchant web site 130 and presents the customer with the product detail page for the Tiger Woods book. The graphic icon 212 of the book cover art also functions as a referral link enabling the customer to click on the icon 212 to access the merchant web site 130.

The affiliate web site 120 may include referral links to the merchant web site 130 on one or more of its web pages. Furthermore, the referral links may relate to different products and/or product groups sold by the merchant or they may relate generally to the merchant web site 130, such as a banner ad for the merchant web site 130 or a hyperlink to the merchant web site's home page.

The exemplary web page 210 also includes a listing of recommended titles 216 which are top sellers within communities related to the affiliate. In the exemplary listing 216, the two communities, "Tiger Woods Fans" and "Golf Enthusiasts," are related to the Unofficial Tiger Woods Fan Club affiliate. The community names may be listed as hyperlinks which, when selected, take the customer to the home page of the corresponding community in the merchant web site 130. In addition, the list of top sellers may be implemented as hyperlinks which, when selected, take the customer to the product detail page of the selected book in the merchant web site 130. In other embodiments, the listing 216 may only include the community names or only the book titles. Furthermore, the number of affiliate-based communities listed may be limited. Alternatively, the listing 216 may include referral links to the community pages in which the featured books are recommended.

The listing of recommended titles 216 is generated by the merchant web site 130 and then provided to customer computer 110 and/or the affiliate web site 120. It is recognized, however, that a third party may generate the listing of recommended items 216 and provide the listing 216 to the affiliate web site 120 without requiring the affiliate web site 120 to contact the merchant web site 130.

B. Product Web Page

Figure 3:
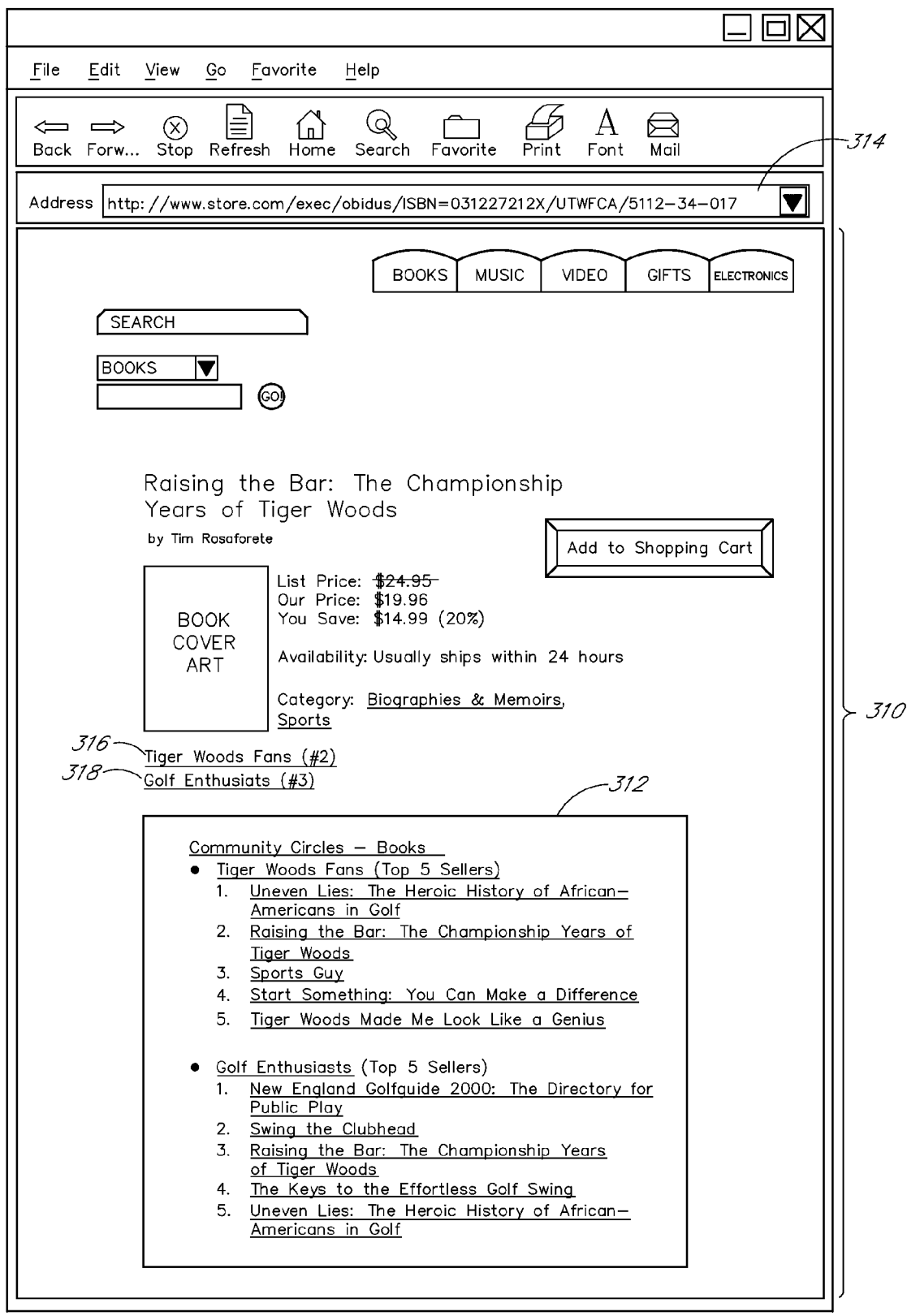
FIG. 3 illustrates one embodiment of an example web page of a merchant web site.

FIG. 3 illustrates a sample product detail page 310 of the merchant web site, as dynamically customized for a customer referred by the Unofficial Tiger Woods Fan Club affiliate. The product detail page 310 provides detailed information about a particular product or group of products. In one embodiment, each product detail page 310 typically includes a description, picture, price, customer review, lists of related products, and information about the product's availability. The merchant web site 130 is preferably arranged such that, in order to access the product detail page 310 of a product, a customer either selects a link associated with that product (e.g., from a browse node page or search results page) or submits a search query uniquely identifying the product. Thus, the customer's accessing of a product detail page generally represents an affirmative request by the customer for information about that product.

The exemplary product detail page 310 includes information about the book titled "Raising the Bar: The Championship Years of Tiger Woods" and enables the customer to purchase the book. The product detail page 310 also includes a list of recommended titles 312 for books that are popular within communities that relate to the referring affiliate. In one embodiment, the product detail page address associated with a referral link may be a URL 314 which comprises the unique customer ID (obtained from the customer's cookie or URL information) as well as a unique affiliate ID that identifies the referring affiliate. The URL may also include a product ID that corresponds to the product featured on the affiliate web site, if applicable. It is recognized, however, that a variety of methods may be used to track where the customer came from as long as the affiliate may be identified. In this example, the merchant web site 130 processes the URL 314 using the product ID to obtain the product's corresponding product detail page 310 as well as the store ID to determine the identity of the referring affiliate. The merchant web site 130 may then select one or more communities related to the referring affiliate and retrieve a listing of the recommended products 312, such as top selling or most frequently viewed products or product groups within the related communities. This listing 312 may be incorporated into the product detail page 310 as a set of selectable hypertext links that correspond to the recommended products, as discussed above. The web page 310 which includes the listing 312 is then passed to the customer computer 110 from the merchant web site 130. In FIG. 3, the web page 310 includes recommendation lists 312 for the affiliate-based communities "Tiger Woods Fans" and "Golf Enthusiasts."

The exemplary web page 310 also includes product hyperlinks 316, 318 signifying that the featured product is included in the corresponding community's recommendation list.

The web page 310 may also include other information from other communities such as, for example, communities that the customer explicitly joined as well as communities to which the customer is implicitly affiliated (e.g., regional/geographic-based communities, age-based communities, and so forth).

C. Community Web Pages

Figure 4:
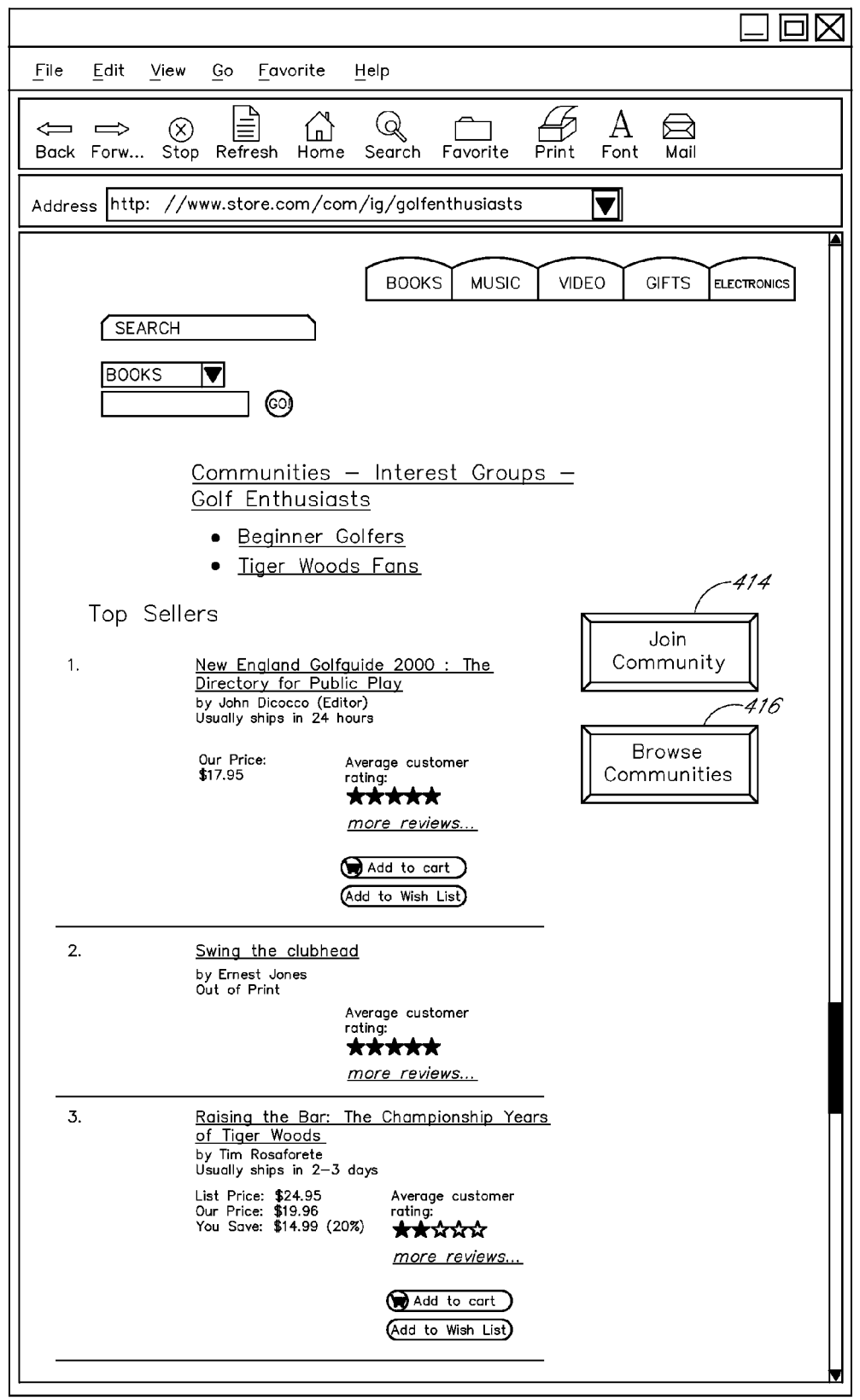
FIG. 4 illustrates one embodiment of an example web page of the merchant web site of a community's top selling books.

FIG. 4 illustrates a sample web page 410 for the community "Golf Enthusiasts," as hosted by the merchant web site 130. The exemplary web page 410 illustrates the Golf Enthusiasts' community's top seller list 412. The web page 410 may be accessed, for example, by selecting a referral link from the affiliate web site 120, by selecting a link from a product detail page 310, or from a link on the Interest Group web page 410 as discussed below. The sample web page 410 includes a list of the top selling books 412 among members of the community and includes interface components that enable a customer to purchase the one or more of the listed products. In addition, the web page 410 enables the customer to join the current community by selecting the "Join Community" button 414. It is recognized that in other embodiments, the customer may automatically join the community by performing an activity, such as browsing a community or making a purchase. The customer may also select the "Browse Communities" button 416 to view other communities and their corresponding lists of recommended products.

Figure 5A:
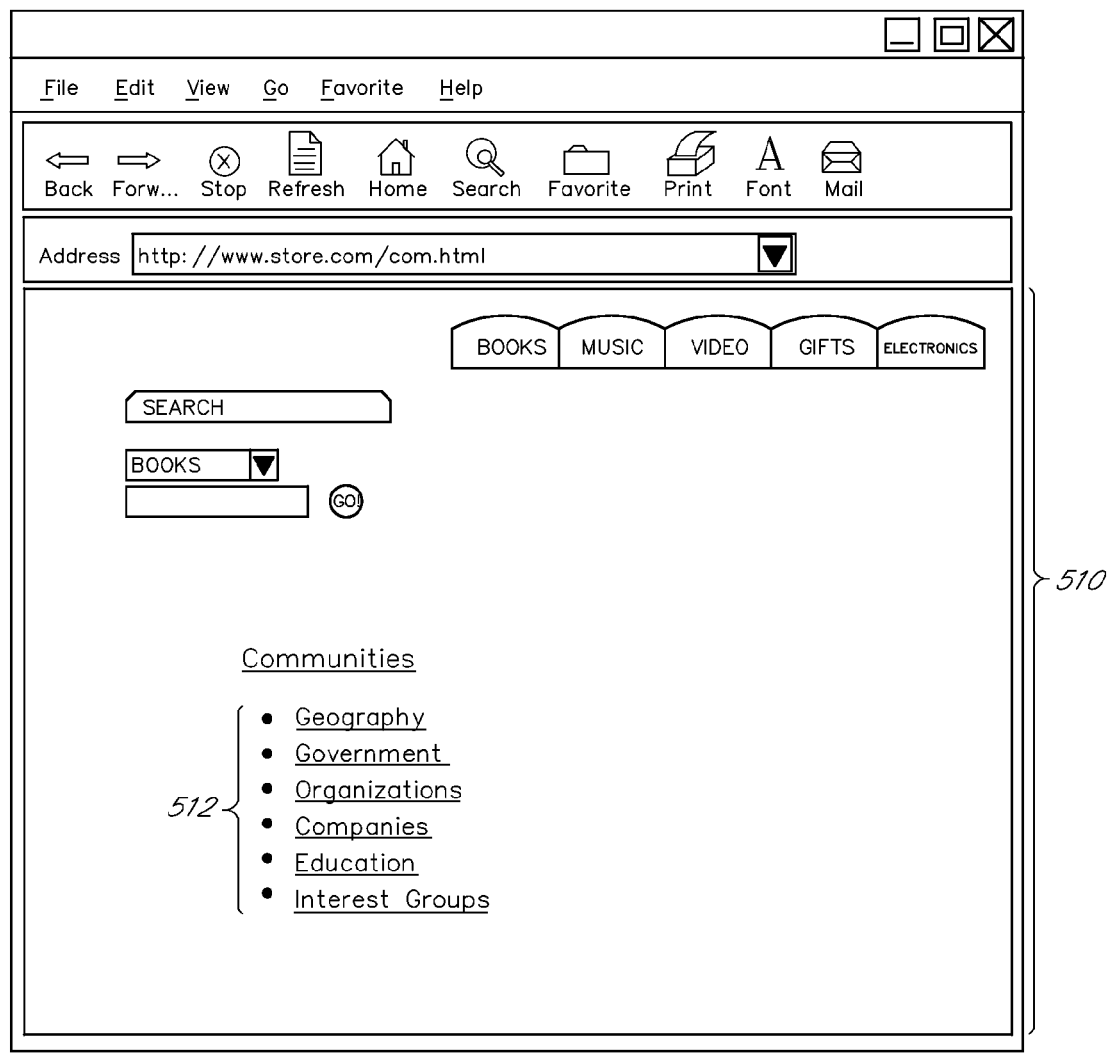
FIG. 5A illustrates one embodiment of an example web page listing community groups in a merchant web site.
Figure 5B:
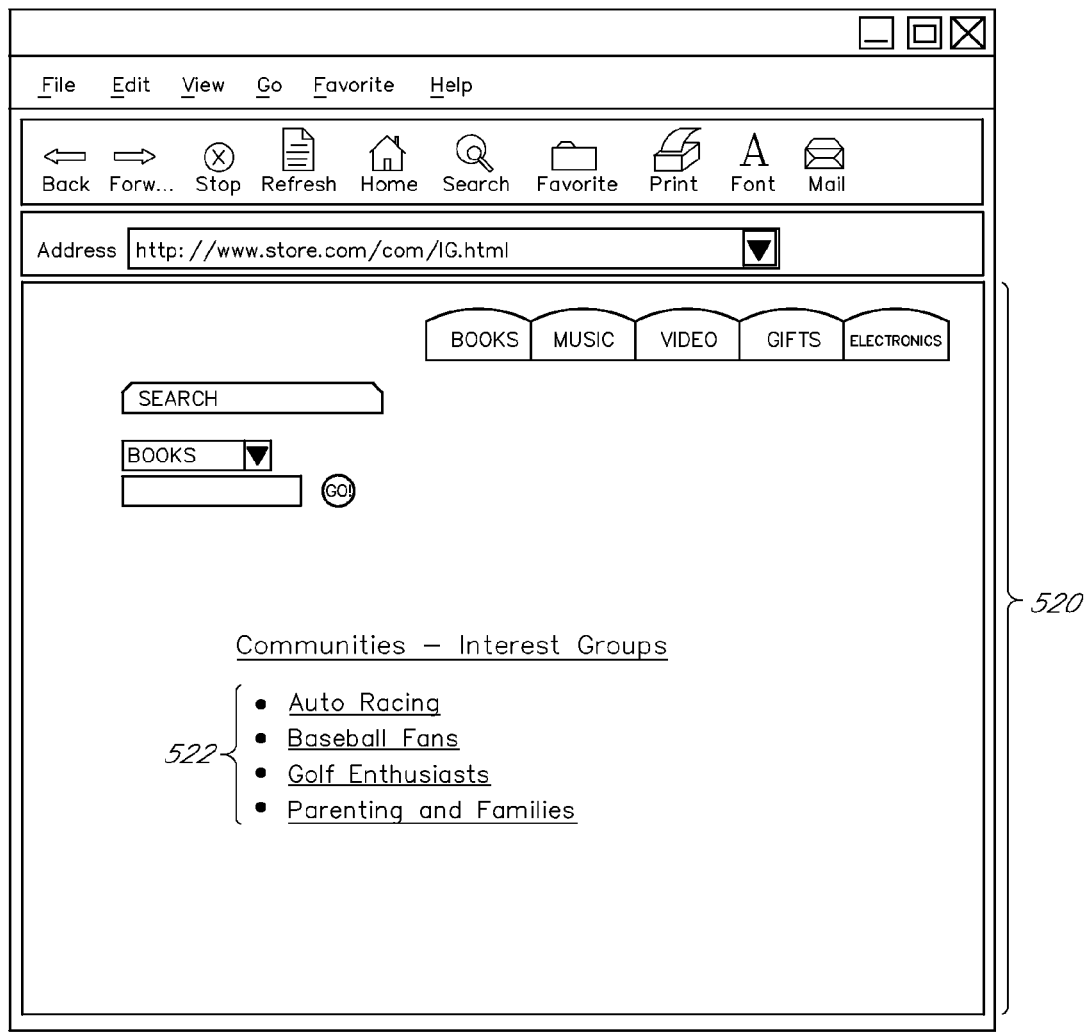
FIG. 5B illustrates one embodiment of an example web page listing interest-based community groups of a merchant web site.

FIGS. 5A and 5B illustrate web pages that enable a customer to access and/or browse the communities. In FIG. 5A, the web page 510 includes a hyperlink listing of the communities 520. The customer may select "Interest Groups" to view communities that have been formed on the basis of related interests as illustrated in FIG. 5B. The web page 520 illustrated in FIG. 5B includes a hyperlink list of the various Interest Groups 522, namely, Auto Racing, Baseball Fans, Beginner Golfers, Golf Enthusiasts, and Parenting and Families. The customer may select the "Golf Enthusiasts" link to access the web page shown in FIG. 4.

The interest-based communities may be accessed via the web pages 510, 520, illustrated in FIGS. 5A and 5B. In addition, the interest-based communities may be accessed via a hyperlink on a product detail page 310. For example, FIG. 3 illustrates a sample product hyperlink shown as "Golf Enthusiasts (#3)" 318 signifying that the featured product is the third item on the Golf Enthusiast's recommendation list. By selecting the hyperlink, the user is presented with the Golf Enthusiasts community page 410 such as that illustrated in FIG. 4. In some embodiments, a similar hyperlink may be included as part of the web detail page of the products that appear in the interest-based purchase circles page. Using FIG. 4 as an example, the product detail pages for "New England Golf Guide," "Swing the Clubhead," "Golf Games," and so forth may include the hyperlink "Golf Enthusiasts" with a number indicating the products' positions in the list. While FIG. 3 illustrates a product detail page 310 accessed via a referral link, it is recognized that product detail pages accessed from within the merchant web site 130 may also include product hyperlinks.

The interest-based communities may also be accessed via product detail pages that relate to an interest-based community. For example, a product detail page, which corresponds to a product referred to by an affiliate, may include links to or recommendations from interest-based communities to which the affiliate is related. For example, FIG. 3 illustrates a product detail page 310 for the book "Raising the Bar." The web page includes hyperlinks to the interest-based communities "Tiger Woods Fans" and "Golf Enthusiasts."

D. Community Browse Trees

Figure 6A:
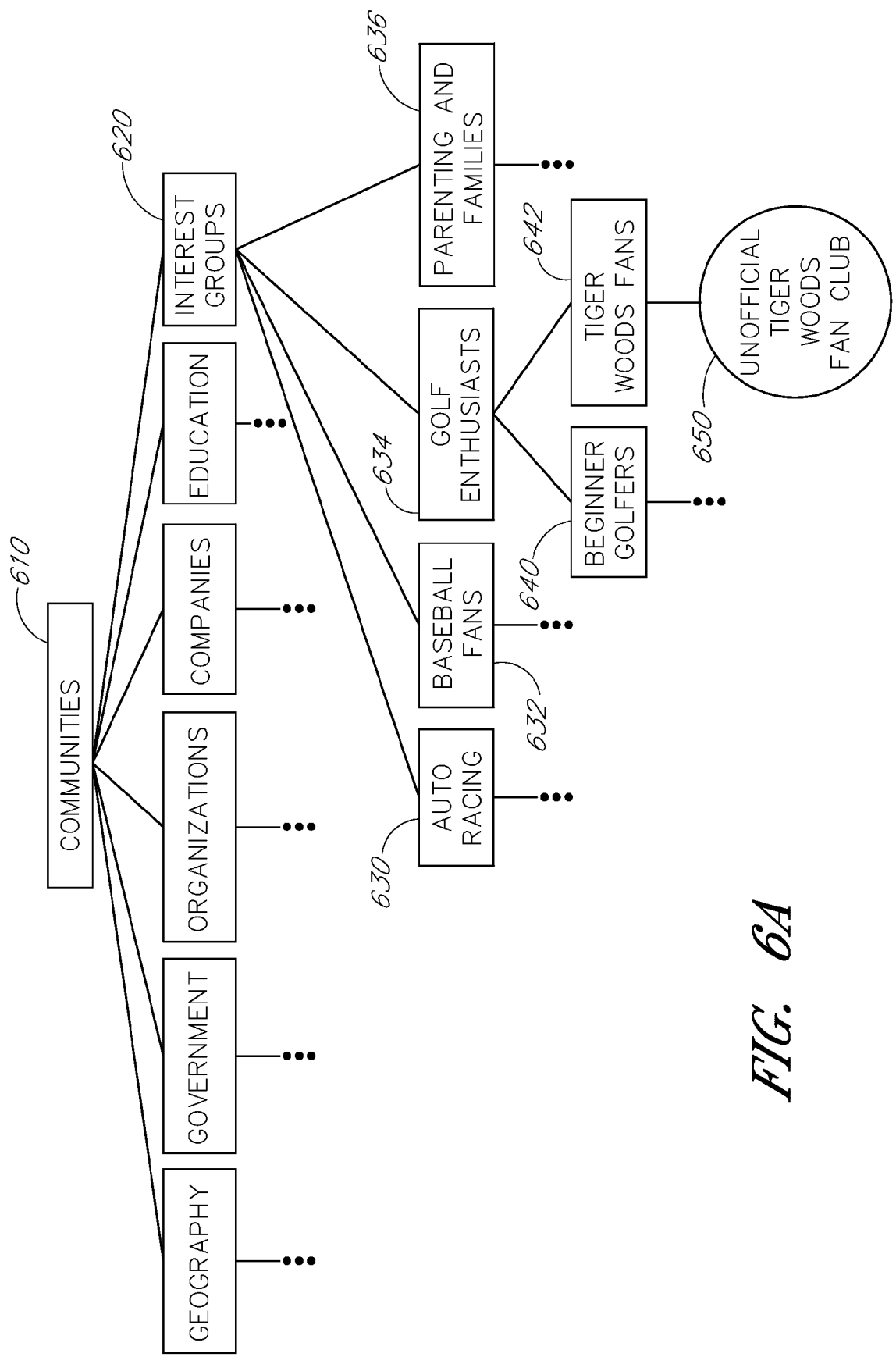
FIG. 6A illustrates one embodiment of a hierarchy of community groups.
Figure 6B:
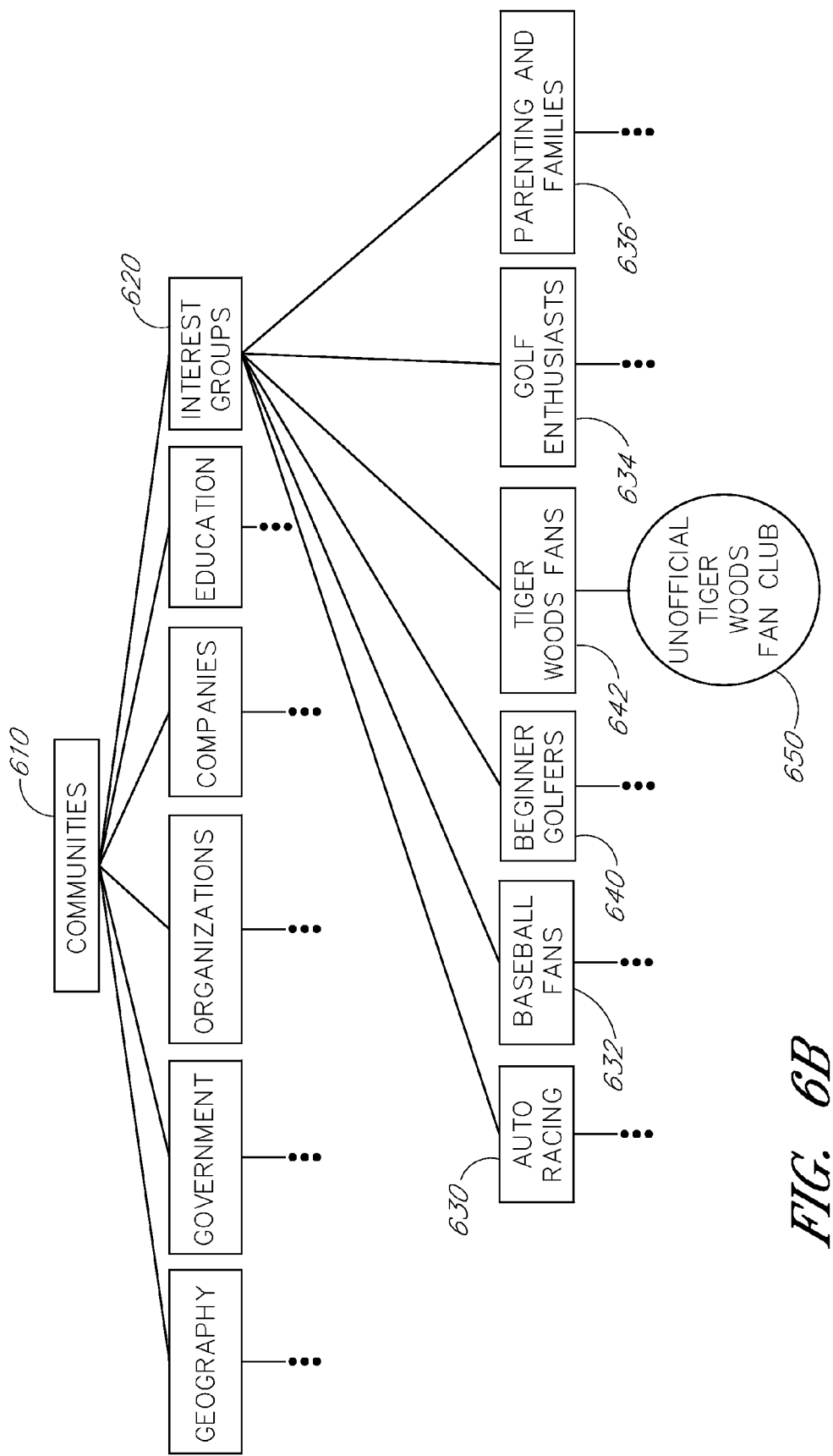
FIG. 6B illustrates an additional embodiment of a hierarchy of community groups.

FIGS. 6A and 6B illustrate browse trees that show how the sample communities may be organized and how a customer may access and/or browse the communities. FIG. 6A illustrates one embodiment of a hierarchy of communities 610 wherein the communities include interest-based groups ("Interest Groups") 620. In one embodiment, the interest groups 620 include affiliate-based communities, though it is recognized that in some embodiments the interest groups 620 may include other communities which are formed on the basis of related interests in addition to or without using affiliate referral data.

The exemplary Interest Groups 620 are organized by topic and include the following communities: Auto Racing 630, Baseball Fans 632, Golf Enthusiasts 634, and Parenting and Families 636. In addition, the Golf Enthusiasts 634 community is a composite community that includes the communities Beginner Golfers 640 and Tiger Woods Fans 642. The "Unofficial Tiger Woods Fan Club" affiliate 650 is illustrated as being associated with the Tiger Woods Fans community 640 as well as the Golf Enthusiasts community 642 (due to the fact that the Tiger Woods Fans community 640 is a sub-community of the Golf Enthusiasts community 634).

FIG. 6A is meant to illustrate one set of communities 610 that may be used to implement the web pages 510, 520 shown in FIG. 5A and FIG. 5B. It is recognized that, in other embodiments, a variety of interest groups, communities, and affiliates may be used. For example, FIG. 6B illustrates another embodiment of a hierarchy of communities 610 wherein the communities Beginner Golfers 642 and Tiger Woods Fans 640 are not sub-communities of the Golf Enthusiasts community, and thus the "Unofficial Tiger Woods Fan Club" affiliate 650 is associated with the Tiger Woods Fans community 640, but not automatically with the Golf Enthusiasts community 634.

It is recognized that a variety of interest groups 620 may be used and that additional interest groups 620 may be added and that categories of interest groups 620 may be formed (e.g., Sports, Family, etc.). Further, the interest groups 620 may include affiliate-based communities and/or other communities that have been formed on the basis of a common interest. The interest groups shown in FIGS. 5B, 6A, and 6B are meant to illustrate embodiments of the invention and not to limit the scope of the invention.

IV. System Architecture

Figure 7:
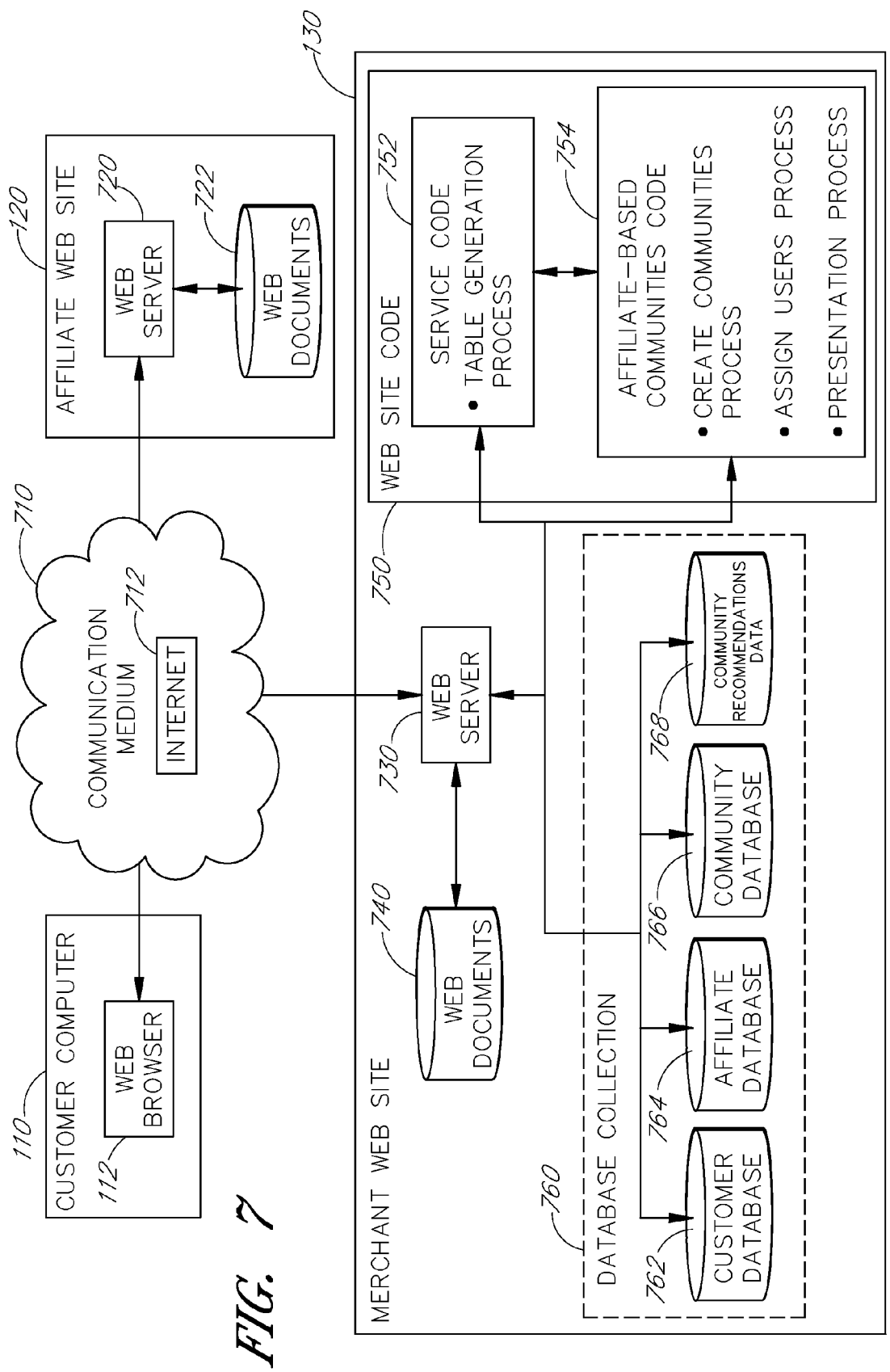
FIG. 7 illustrates a general architecture of one embodiment of an affiliate-based communities system.

FIG. 7 illustrates one embodiment of a general architecture of an affiliate-based community system that operates in accordance with the present invention. The system includes a customer computer 110, an affiliate web site 120, and a merchant web site 130 that communicate via a communication medium 710, such as the Internet 712.

A. Customer Computer

The customer computer 310 may be implemented using any type of computing device that enables a customer to interactively browse a remote web site or online catalog through the communication medium 330 using, for example, a web browser 112, such as, the Netscape® Navigator developed by Netscape, Inc. or the Microsoft® Internet Explorer developed by Microsoft Corp. For example, the customer computer 310 may be, for example, an interactive television, a cellular phone, a personal digital assistant, an interactive wireless communications device, a telephone that connects with an Automated Voice Recognition ("AVR") system, a handheld computer, or the like, which interacts with the communication medium.

B. Affiliate Web Site

The affiliate web site 120 is a separate web site from the merchant web site 130 that provides one or more links to the merchant's web site 130. Typically, the affiliate web site 120 is owned and operated by an individual or business entity ("affiliate") that is not in the same business as that of the merchant. For example, the affiliate may be an individual that is in the business of rating mystery novels or providing golf lessons. In one embodiment, the affiliate has registered with the merchant using, for example, an online registration process (not shown). Typically, the affiliate and the merchant have an agreement under which the affiliate receives commissions or bounty payment for customer referrals. The affiliate web site 120 may identify customers using any appropriate method, such as cookie retrieval or log-in procedures.

In one embodiment, the affiliate web site 120 includes a web server 720 used to communicate with the customer's web browser 112 and a database of web documents 722 to be sent to the user. The web documents 722 may include standard HTML documents as well as other types of documents. The web server 720 may process requests for the documents 722, review the documents 722, and send the documents 722 to the requesting computer via the communication medium 710.

The web documents 722 may include special hyperlinks ("referral links") that enable customers to access the merchant web site 130. Typically, one referral link is provided for each product displayed on the affiliate's web site 120. Alternatively, a referral link may be provided for a group of products ("product group") or to some of the merchant's general web pages (e.g., home page, search page, community pages, etc.). When a customer selects a referral link associated with a particular product or product group, the customer is automatically connected to the merchant web site 130 and is presented with various options for purchasing the selected product from the merchant. The referral link thus serves as a referral mechanism for referring the customer to the merchant web site 130 from an affiliate web site 120.

In one embodiment, the referral links are provided in association with additional information that is transmitted to the merchant web site 130 in response to the selection of the link. For example, the additional information may be embedded in a pre-defined format within the associated URL and include a unique identifier for the affiliate (assigned upon enrollment) and a unique identifier for the selected product (such as the ISBN of a book). The merchant web site 130 uses this information to identify the affiliate that is the source of the referral and to credit the referral to the affiliate, such as, if the customer subsequently performs specific activity (e.g., purchasing the product, placing the product in his online shopping cart, or browsing through a group of products). Commission payments may then be automatically paid to the affiliates on a periodic basis, such as, for example, once a month, bi-weekly, daily, and so forth.

C. Merchant Web Site

The merchant web site 130 is a web site that provides various functionality for enabling customers to purchase products including products selected from the affiliate web sites 120. Typically, the merchant web site 130 is operated by a business entity ("merchant") that handles the various order processing, shipping, collections, and customer service tasks associated with the sale of goods. The merchant web site 130 may include enrollment software (not shown) that implements an online registration process (not shown) for enabling other entities, such as individuals, companies, and so forth, to register as affiliates. The merchant web site 130 may identify customers using any appropriate method, such as cookie retrieval or log-in procedures.

As is common in the field of electronic commerce, the merchant web site 130 may include functionality that enables customers to search, browse, and make purchases from an online catalog of items or "products," such as book titles, music titles, video titles, DVDs, toys, and electronics products. The various product offerings may be arranged within a browse tree in which each node represents a category/group or subcategory/subgroup of products. Browse nodes at the same level of the tree need not be mutually exclusive.

The merchant web site 130 may also include a shopping cart feature (not shown), wherein customers may add and remove items to and from a personal shopping cart which is persistent over multiple sessions. (As used herein, a "shopping cart" is a data structure and associated code which keeps track of items that have been selected by a customer for possible purchase.) For example, a customer may modify the contents of the shopping cart over a period of time, such as one week, and then proceed to a check out area of the site to purchase the shopping cart contents.

The sample merchant web site 130 illustrated in FIG. 7 includes components that may be used to implement the above-described features. The exemplary merchant web site 130 includes a web server 730 which accesses a database of web documents 732 and related content. The web documents 732 may include standard HTML documents as well as other types of documents. The web server 730 may process requests for the documents 40, review the documents 740, and send the documents 740 to the requesting computer via the communication medium 710. The documents 740 may be used to generate the merchant web pages, such as those illustrated in FIGS. 3, 4, 5A, and 5B.

The web server 730 communicates with web site code 750 as well as a database collection 760 to create affiliate-based communities that are based upon the customer's interaction with affiliate web sites 120, to manage the affiliate-based communities, and to provide customers with recommendations. The web site code 750 may include service code 752, as described in detail in U.S. patent application Ser. No. 09/377,322, filed Aug. 19, 1999 and entitled "USE OF CONTACT INFORMATION TO ASSIST USERS IN EVALUATING ITEMS," which is hereby incorporated by reference. The web site code 750 may also include affiliate-based communities code 754 discussed in detail below. The merchant web site 130 also includes a database collection 760 which includes a customer database 762, an affiliate database 764, a community database 766, community recommendations data 768, and a products database of product data (not shown).

1. Web Site Code

The web site code 750 illustrated in FIG. 7 includes service code 752 and affiliate-based communities code 754.

a. Service Code

The service code 752 may include one or more processes for generating tables of community recommendations including best selling lists, recommended products, unique products, and so forth for the various communities such as the table 136 illustrated in FIG. 1. The table generation process may be implemented as an off-line process that periodically (e.g., daily, weekly, bi-weekly, etc.) generates the tables based on information stored in the customer database and the community database. The service code 752 analyzes product interest activity, such as purchase histories, product viewing histories, and other browsing histories, to identify recommended items. The service code 752 may also include a process for generating community best seller web pages such as that illustrated in FIG. 4. Examples of algorithms that may be used to perform such analysis as well as more details on the service code are described in U.S. patent application Ser. No. 09/377,322 referenced above. For a detailed description of one embodiment of a table generation process, please refer to the section below entitled "Service Code Process—Table Generation Process."

b. Affiliate-Based Communities Code

The web site code 750 may also include affiliate-based community code 754 as illustrated in FIG. 7. The affiliate-based community code 754 includes a process for creating affiliate-based communities, a process for assigning customers to affiliate-based communities, and a process for presenting affiliate-based community recommendations to customers. For a detailed description of the affiliate-based community code 754 processes, please refer to the section below entitled "Affiliate-Based Community Code Processes."

2. Database Collection

The database collection 760 illustrated in FIG. 6 includes a customer database 762, an affiliate database 764, a community database 766, and community recommendations data 768.

a. Customer Database

The customer database 762 or user database stores information about existing customers of the merchant web site 130. This information, sometimes referred to as the customer's "user profile," may include the name, shipping address, e-mail address, and payment information of the customer. The information may also include affiliates that have referred the customer to the merchant web site 130, the customer's related communities (e.g., communities that the customer is a member), the customer's presentation preferences, as well as service preference data, that is whether the customer has elected to participate in various services. The customer database 762 may also store information about the customer's activity or interactions with the merchant web site 130, such as product interest activity (e.g., purchase history data, shopping cart history data, click through data, etc.). One embodiment of a user profile 132 is illustrated in FIG. 1.

b. Affiliate Database

The affiliate database 764 stores information about the affiliates enabling the merchant web site 130 to properly track and credit affiliate referrals. This information may include the unique ID assigned to the affiliate and enrollment information pertaining to the affiliate, such as, for example, affiliate name, contact person data, payee data, name of web site, home page URL of web site, intended product listings, payment information, and so forth.

c. Community Database

The community database 766 includes information about the communities of the merchant web site 130. This information may include, for example, community name, type of the community (e.g., college/university, local community group, etc.), location of the community (e.g., city, state, country, etc.), whether the community is private, authentication information required to join the community, as well as any community policies (e.g., by joining, all users agree to expose their purchases to other members). For implicit membership communities, the community database 766 may also include information about the conditions which give rise to membership. As indicated above, the information stored within the community database 766 may be generated by end users, system administrators, or both.

The community database 766 may also include information about any composite communities that have been defined. As previously discussed, the communities may include composite communities which are communities formed as the collection of two or more other communities ("sub-communities"). For example, the communities "Tiger Woods Fans" and "Beginner Golfers" may be combined to form a composite community of "Golf Enthusiasts." Moreover, "Tiger Woods Fans" and "Nick Faldo Fans" may be combined to form a composite community of "Golf Legends," and "Golf Legends" and "Beginner Golfers" may be combined to form a composite community of "Golf Enthusiasts." For each composite community, the community database 766 may store information such as the community name and a list of the community's sub-communities, as well as any individual affiliates that are members of the composite community. The community database 766 may also include information about relationships or associations among communities.

In other embodiments, the community database 766 may also store information about the affiliate-community relationships as well as the user-community relationships. One embodiment of a set of community definitions 134, which may be stored in the community database 766, is illustrated in FIG. 1.

d. Community Recommendations Data

The community recommendations data 768 tracks information relating to the recommendations for the communities. The recommendations may include bestseller lists, most frequently browsed lists, unique items lists, and so forth. For example, in one embodiment, each record in the community recommendations data for a best seller list may include: (a) the product's ID and (b) a count value which represents, for a given time window, the number of copies purchased by members of the community. It is recognized that the product IDs may be assigned and/or processed such that different media formats (e.g., paperback, hardcover, and audio) of the same title are treated as the same item.

In some embodiments, the community recommendations data 768 may be stored only for non-composite communities such that the merchant web site 130 may combine the lists of the non-composite communities to form a composite list for a composite community. In other embodiments, community recommendations data 768 may be stored for each community. One embodiment of a set of community recommendations data 136 is illustrated in FIG. 1.

e. Products Database

As mentioned above, the database collection 760 may also include a products database of product information. Thus, information such as the product's name, code, price, medium, author, publisher, and so forth may be stored.

f. Alternative Implementations

In connection with the database collection 760, in one embodiment, there may be several processes (not shown) such as ID generators, number generators, statistic generators, session generators, and temporary storage units that work with the database collection 760. Furthermore it is recognized that the database collection 760 may be implemented using a variety of different databases such as relational databases, flat file databases, or object-oriented databases. Moreover, while the database collection 760 depicted in FIG. 7 is comprised of several separate databases, it is recognized that in other embodiments, the database collection 760 may include other databases or two or more of the databases may be combined. In addition, the database collection 760 may be implemented as a single database with separate tables or as other data structures that are well know in the art such as linked lists, stacks, binary trees, and so forth.

D. Communications Medium

The presently preferred communication medium 710 includes the Internet 712, though a wide range of interactive communication mediums may be employed in the present invention as is well known to those skilled in the art.

E. Other Embodiments

While FIG. 7 illustrates an embodiment wherein the merchant web site 130 provides the affiliate-based communities service, it is recognized that in other embodiments, the merchant web site 130 may work in conjunction with one or more third parties (not shown) to provide affiliated-based community recommendations. For example, the merchant web site 130 may provide a third party web site with customer profile information such as, referring affiliates, browsing histories, and affiliate-based community definitions. Note that in some embodiments, the third party may or may not receive customer identifiers. The third party web site may then create the community-specific recommendation lists. In some embodiments, the third party web site may receive requests for recommendations and/or send the recommendations to the requesting computer.

Furthermore, although the embodiments described herein use web site technology to disseminate documents, a variety of document types and electronic dissemination technologies may be used. For example, the affiliate's HTML documents may be in the form of hypertextual e-mail messages that are disseminated by a list server or PUSH documents disseminated by a PUSH server. As interactive television, video-on-demand, and Web TV technologies continue to evolve, it is contemplated that the "web documents" may include video advertisements that are displayed to the customer on a television screen. Further, although hypertextual documents are preferably used, it is possible for an affiliate to use non-hypertextual catalogs (including paper-based product catalogs) that simply instruct the customer to manually enter the appropriate URL (including the referral information) into a browser program.

In addition, although the affiliate-based communities system is described using "an" affiliate web site 120, is recognized that a given affiliate may disseminate its web documents (using the single affiliate ID assigned during online registration) from multiple different sites, including sites that use different document formats and transfer protocols. In addition, an affiliate may provide referrals to more than one merchant. Further, although the system is described herein in the context of a merchant that sells products, it is recognized that the architecture may also be used to sell services including online services that are provided over the Internet.

V. Processes

As noted above, the affiliate-based communities system may include service code processes and affiliate-based communities code processes. As used herein, the term "process" refers to a computer memory having executable code stored therein which, when executed by a computer processor, performs one or more operations.

A. Service Code Process—Table Generation Process

Figure 8:
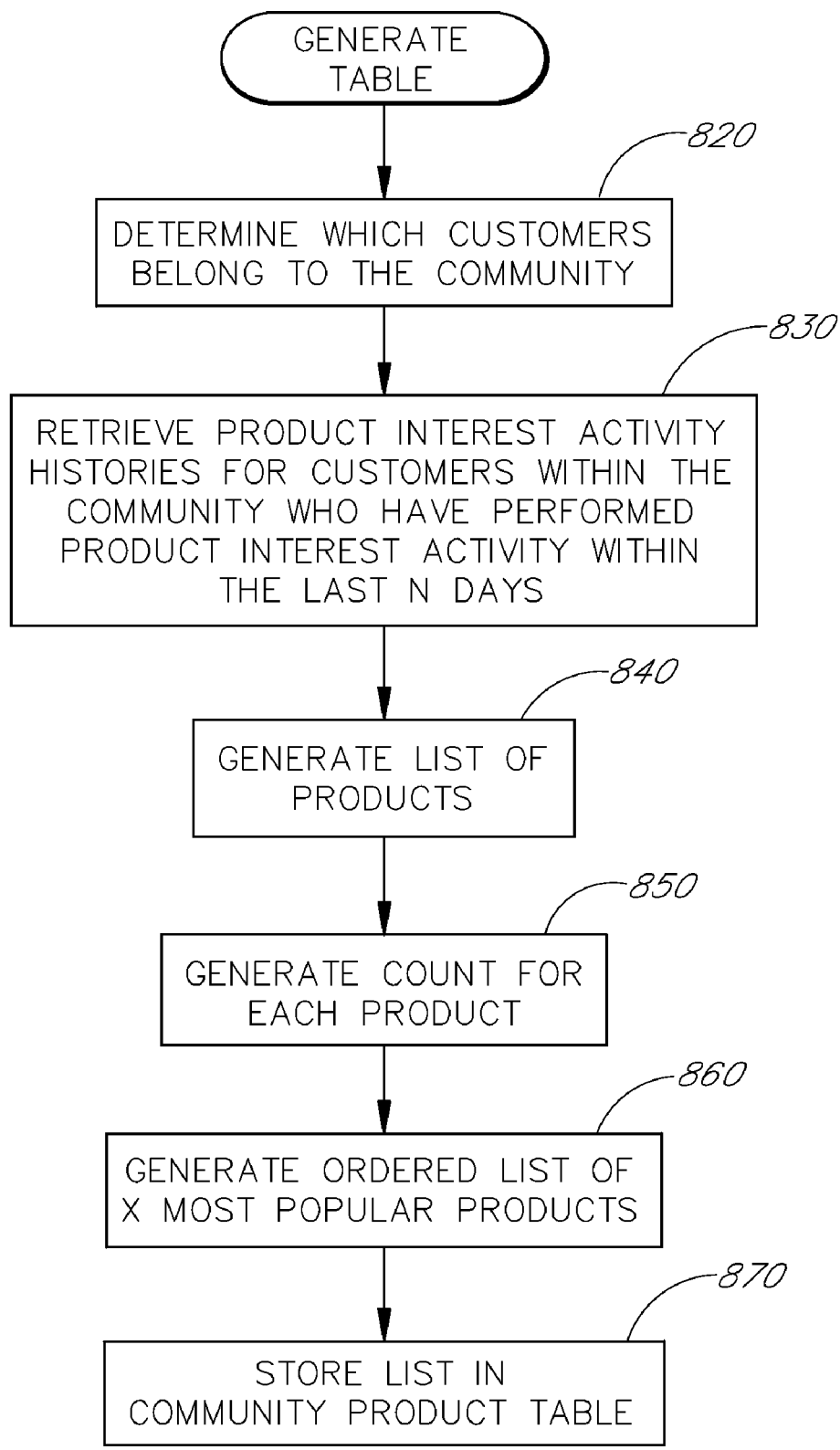
FIG. 8 illustrates a flow diagram one embodiment of a table generation process.

FIG. 8 illustrates one embodiment of a community recommendations table generation process ("table generation process") used to generate community recommendations data 768 such as the set of data 136 shown in FIG. 1. The merchant web site 130 may execute the table generation process off-line on a periodic basis, such as daily or weekly. It is recognized, however, that other entities, such as outside third parties may also execute the table generation process and that the process may be executed at a variety of times. Furthermore, the table generation process may be implemented to update the community recommendations data 768 in real-time in response to customer activity.

The table generation process determines which customers belong to the community (block 820). This information may be stored in the community database 766 or generated on real-time (e.g., querying the customer database). Next, the table generation process retrieves the product interest activity histories for customers within the community who have performed product interests activity within a predetermined period of time N (e.g., 2 hours, 4 days, 30 days, etc.). The variable N specifies the time window to be used for generating the community recommendations data 768 and may be selected according to the desired goals of the service. Different time windows may alternatively be used for generating different types of lists (e.g., best seller lists, most popular lists, hotselling items lists), and different time windows may be applied to different types of communities. As discussed above, product interest activity may include a wide variety of customer activity, such as, for example, purchases, viewing of product detail pages, searching, submission of ratings or reviews, placing a bid, adding products to an online shopping cart, and so forth.

Proceeding to the next state, the table generation process generates a list of products for which there was some product interest activity within the last time period N (block 840). Next, the table generation process generates a count for each product (block 850). The product's count may be stored in a data structure such as a temporary array ("product count array") wherein each entry in the array includes a product count value indicating, for the community/product pair, the number of times product interest activity was performed by customers within the time period N. A pseudocode listing of a routine that may be used to generate the product count array is shown in Table 1. Multiple instances of activity for the same product by the same customer may be counted as a singe activity or may be counted as multiple instances of activity when generating the array.

TABLE 1

For each customer;
    For each product incurring some product interest activity by customer in last period of time N;
        increment count(community, product)

Proceeding to the next state, the data stored in the product count array is used to generate the community recommendations lists (block 860). For example, the table generation process may form a list of the products, sort the list according to counts, and then truncate the list to retain only the X most highly recommended titles, thereby creating a list where X is an integer (e.g., 100). It is recognized that product velocity and/or acceleration may also be incorporated into the process. The velocity and acceleration values may be calculated by comparing count-ordered lists generated from the temporary table to like lists generated over prior time windows. For example, a product's velocity and acceleration may be computed by comparing the product's position within a current purchase-count-ordered list to the position within like lists generated over the last 3 days. The velocity and acceleration values may be used, along with other criteria such as the purchase counts, to score and select the products to be included in the lists.

As mentioned above, the censored chi-square recommendation algorithm described in the attached appendix may be used to identify the most popular products in the community. When such an algorithm is used, the products identified in block 860 are those whose popularity levels are significantly higher in the community than in the general user population.

Proceeding to the next state, the table generation process stores the lists in a community recommendations table (block 870), such as the one illustrated in FIG. 1. In one embodiment, the new table replaces any existing table. Furthermore, the popularity lists of communities that have less than a pre-specified threshold of product interest activity (e.g., less than 5) may optionally be omitted from the community recommendations table.

The table generation process may be used to update and/or create the community recommendations table for one or more communities at a time. Furthermore, the community recommendations table may be generated based upon one type of product interest activity, such as the viewing of product detail pages, or upon multiple types of product interest activity wherein the count value represents a collective value of the product interest activity performed. In addition, more than one count value may be stored in the array. For example, the array values, for each community/product pair may include:

(product, total count, purchase activity 1 count, . . . , purchase activity X count)

where X is an integer.

It is recognized that in other embodiments, the table generation process may generate recommendation lists for composite communities by combining the recommendation lists of the sub-communities that belong to the composite communities. Furthermore, generation of the recommendation lists for the composite communities may be included as part of the table generation process or it generated by combining the lists in real time.

B. Affiliate-Based Communities Code Processes

As noted above, the affiliate-based community code 754 includes a process for creating affiliate-based communities, a process for assigning customers to affiliate-based communities, and a process for presenting affiliate-based community recommendations to customers.

1. Create Communities Process

Figure 9:
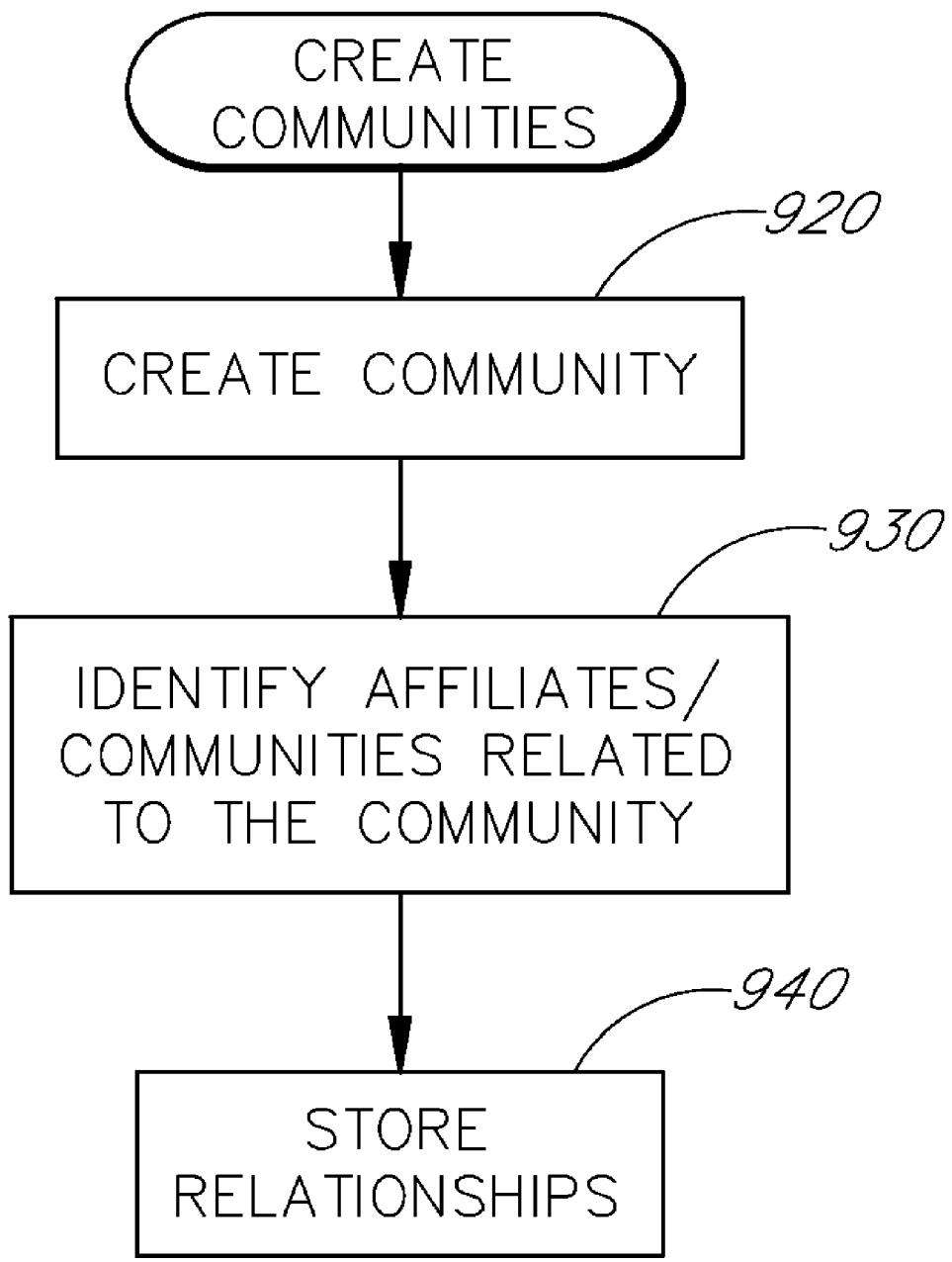
FIG. 9 illustrates a flow diagram of one embodiment of a create communities process.

One embodiment of a process for creating affiliate-based communities ("create communities process") is illustrated in FIG. 9. In one embodiment, the merchant web site 130 executes the create communities process off-line as necessary. It is recognized, however, that the create communities process may be run in real-time and may be executed on a periodic basis, such as, for example, hourly, daily, weekly, and so forth.

The create communities process creates a new community (block 920). In this block, the create communities process may receive user specified information about the community such as, for example, the name of the community, the type of community, the maximum/minimum number of customers for the community, as well as any other information that may relate to the community. Proceeding to the next state (block 930), the create communities process identifies affiliates or other communities (e.g., sub-communities) that are related to or make up the new community. This identification may be done automatically (e.g., using key words and/or customer database conditions which give rise to membership) and/or manually using explicit user-designations as to which affiliates belong to the community. In one example, the user may designate that the "Tiger Woods Fan Club" affiliate, the "PGA" affiliate, and the "Women's Golf Club Association" affiliate all relate to the "Golf Enthusiasts" community. In addition, other communities may also be designated as related to the community. For example, the "Golf Enthusiasts" community may be a composite community that is comprised of affiliates as well as other existing communities.

After the affiliates and communities related to the new community have been identified, the create community process proceeds to the next state (block 940) and stores the relationships, such as, for example, in the community database 766. It is recognized that in other embodiments, the create communities process may store the relationships in the affiliate database 764, in the customer database 762, and/or in other databases (not shown).

While FIG. 9 illustrates one embodiment of a create communities process, it is recognized that other implementations may be used.

2. Assign Customers Process

The affiliate-based community code 754 may also include a process for assigning customers to affiliate-based communities ("assign customers process"). In one embodiment, the merchant web site 130 may execute the assign customers process offline on a periodic basis, such as daily or weekly, and search customer records to determine which customers should be assigned to the various communities.

Figure 10:
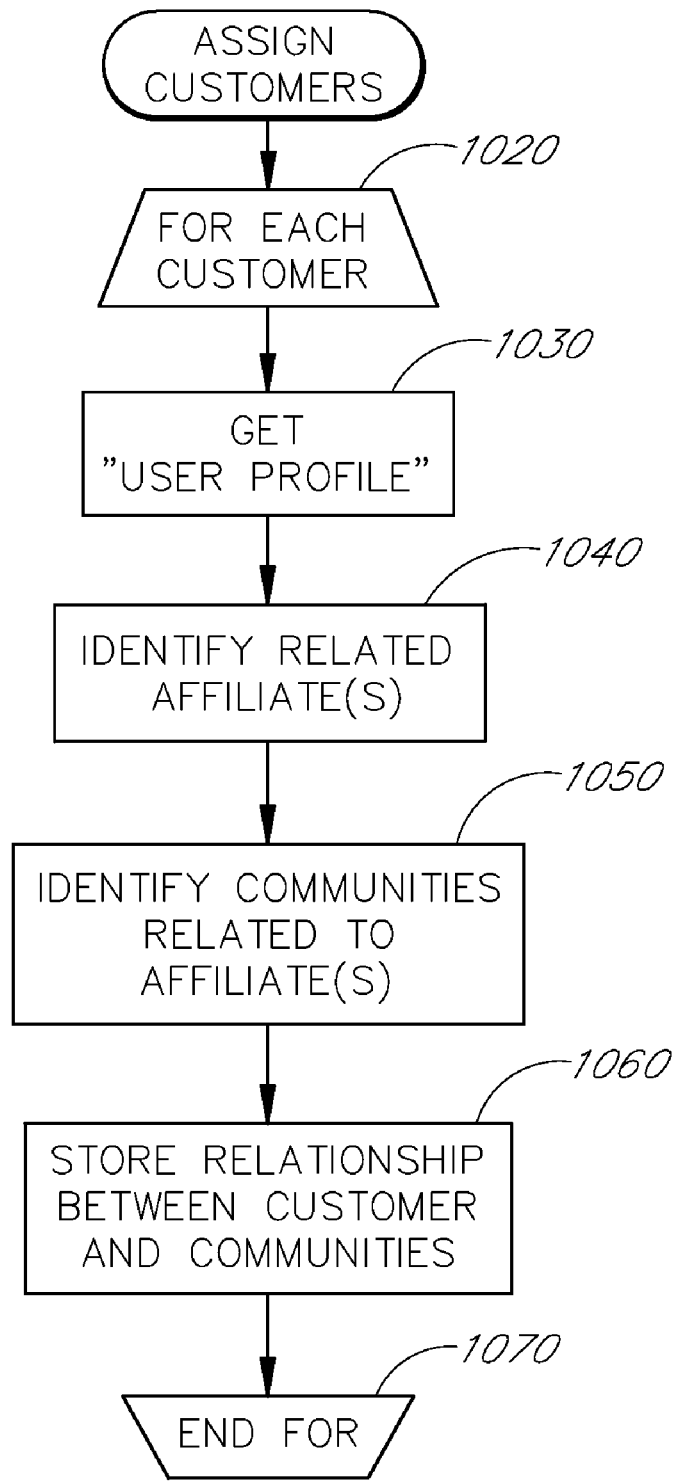
FIG. 10 illustrates a flow diagram of one embodiment of a customer assignment process.

One embodiment of an assign customers process is illustrated in FIG. 10. For each customer (block 1020), the assign customers process retrieves a user profile 132 from the customer database 762 (block 1030). It is recognized that in other embodiments, the user profile 132 may be stored in other locations. Proceeding to the next state, the assign customers process identifies the affiliates that are related to the customer (block 1040). In one embodiment, an affiliate and a customer are related if the customer has selected a referral link on the affiliate's web site 120. The affiliates related to a customer may be stored explicitly in the user profile such as, for example, as a list of related affiliates, as a record of related affiliates, and so forth. In other embodiments, however, the user profile 132 and/or the customer database 762 may store activity information about the customer which may include, for example, a list of affiliate web sites visited by the customer, referral links selected by the customer, and so forth. Thus, in some embodiments, the assign customers process may process the activity information to identify related affiliates, such as, for example, extracting the affiliate ID from the referral link and determining which affiliate corresponds to the affiliate ID.

A customer may be assigned to each affiliate to which he is related, or the customer may be assigned to a subset of the affiliates to which he is related. In one embodiment, the affiliates may be ranked in order based upon criteria such as alphabetical listing of affiliate names, affiliates referral activity, and so forth such that a subset of affiliates may be selected, if desired.

Proceeding to the next state, the assign customers process identifies communities related to the various affiliates (block 1050). In one embodiment, the assign customers process searches for the affiliate in the community database 766 and/or the affiliate database 764 to determine the communities to which the affiliate is related. A customer may be assigned to one or more of the communities to which the customer's affiliates are related. After the communities have been identified, the assign customers process proceeds to the next state and stores the relationships between the customer and the communities (block 1060). The relationship may be stored, for example, in the customer database 762, in the community database 766, or in another database. After the relationships have been stored, the assign customers process proceeds to the next state (block 1070) and retrieves another user profile if there are additional customers (blocks 1020, 1030).

While FIG. 10 illustrates one embodiment of an assign customers process, it is recognized that other embodiments may be used. For example, the assign customers process may run on a subset of customers such as those customers who have made purchases within the last year, those customers who have visited affiliate web sites within a designated time period, and so forth. In addition, the customers may be related to communities in real-time. For example, as a customer visits a merchant web site from an affiliate web site 120, the customer may be automatically added to the community or automatically asked if he wishes to be added to the community. In such cases, the assign customers process may be altered such that it is performed in real time. It is also recognized that customers that are not related to an affiliate may be designated as a member of the community.

3. Presentation Process

The affiliate-based community code 754 also includes a presentation process for presenting affiliate-based community recommendations to the customer ("presentation process"). In one embodiment, the presentation process is performed dynamically by the merchant web site 130 in response to a request for a web page that includes community recommendation information. Various embodiments of a presentation process are illustrated in FIG. 11 and FIG. 12.

Figure 11:
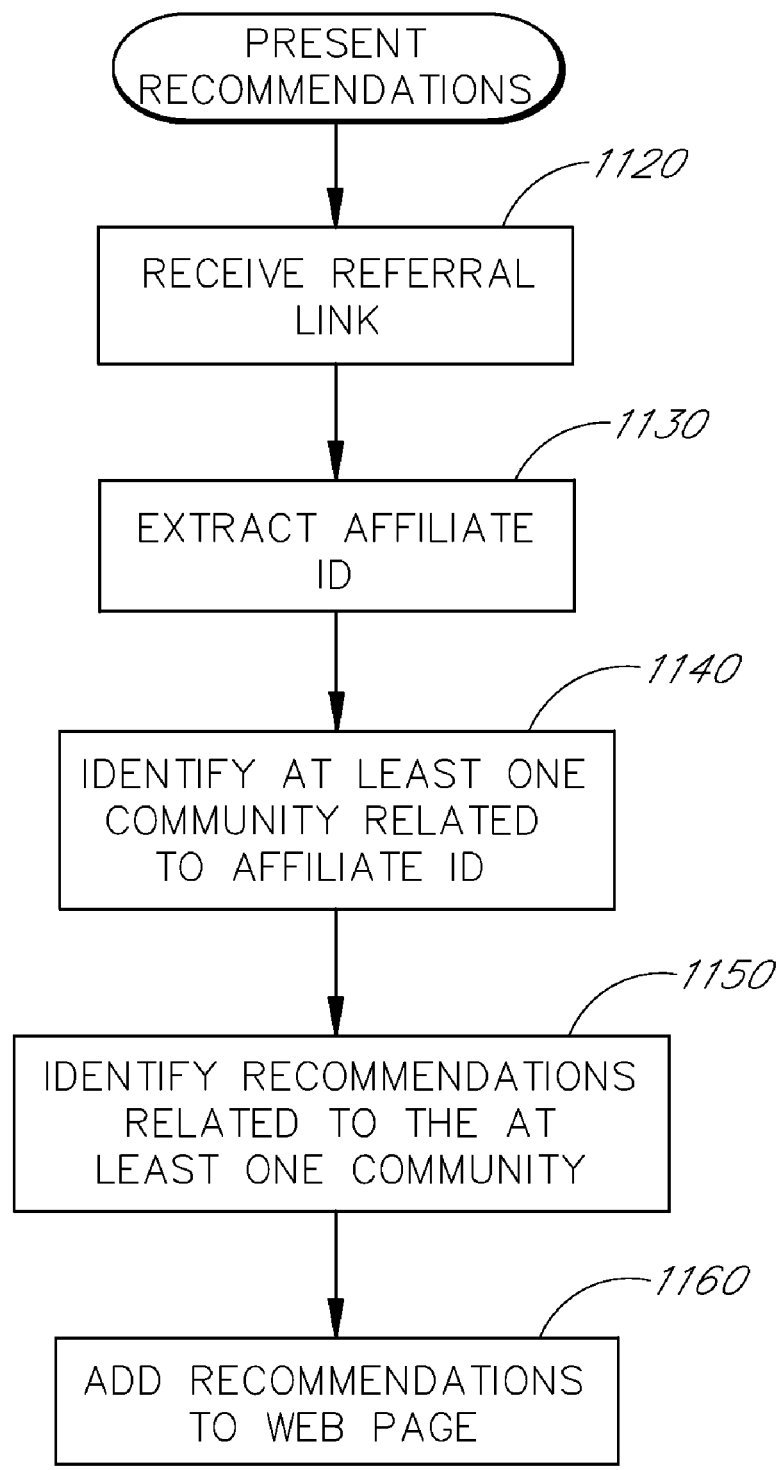
FIG. 11 illustrates a flow diagram of one embodiment of a presentation process.
Figure 12:
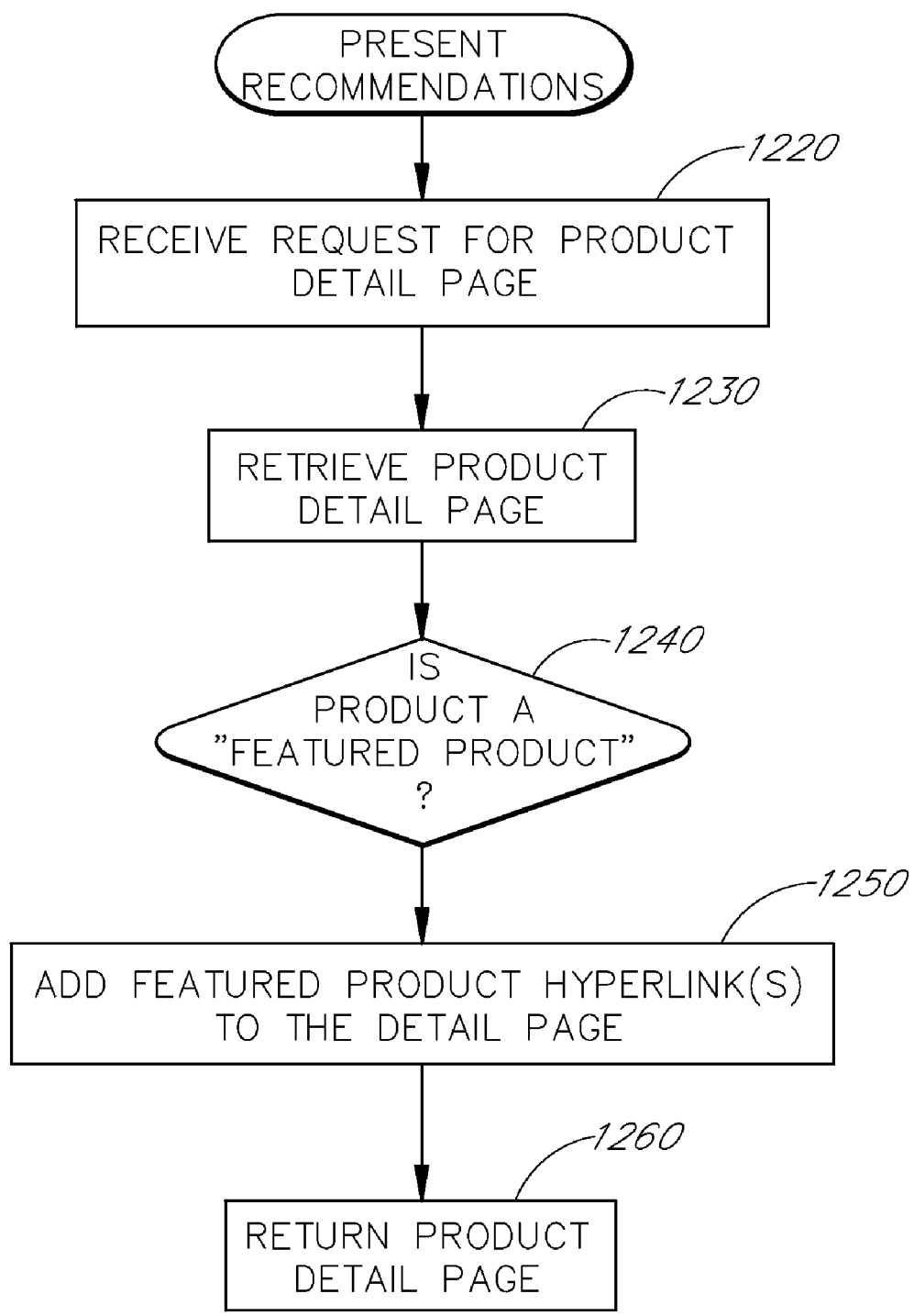
FIG. 12 illustrates a flow diagram of an additional embodiment of a presentation process.

With reference to FIG. 11, the presentation process receives a referral link (block 1120). As previously discussed, the referral link may be a hyperlink to a web page of a merchant web site 130 that enables the customer to select products for prospective purchase. In one embodiment, the referral link includes the customer ID (if available), the product ID and the affiliate ID.

After receiving the referral link, the presentation process proceeds to the next state and extracts the affiliate ID (block 1130). As discussed, the affiliate ID represents and/or corresponds to one of the merchant's affiliates. Proceeding to the next state, the presentation process identifies at least one community related to the affiliate (block 1140). The presentation process may look up the affiliate in the affiliate database 764, the community database 766, and/or another database to determine whether there are any communities related to the designated affiliate. If there are communities related to the designated affiliate, the customer may be "assigned" to the community, in real time, such as by updating the customer's profile with the referring affiliate's ID. In other embodiments, the customer may not be "assigned" to a community until the customer has explicitly agreed to the assignment. In addition, the customers may be assigned off-line to communities on a periodic basis using the assign customers process discussed above.

Once a customer is "assigned" to one or more communities, becoming a member of the community, various web pages of the merchant web site 130 may thereafter be customized with community-specific content either automatically or after receiving consent from the customer. Furthermore, the assignment may remain persistent from browsing session to browsing session. It is recognized that in other embodiments, the assignment may be temporary.

If the affiliate belongs to more than one community, the presentation process may present to the customer information for a subset of the related communities or for all of the related communities. In other embodiments, however, the process may select one or more communities to be related to the affiliate. Further, the presentation process may present the customer with a list of recommended products for each community, for one or more communities, as well as any combination of the above. FIG. 2 illustrates an embodiment in which a separate list for each affiliate-based community has been presented. While the lists in FIG. 1 include the same book, it is recognized that in some embodiments, the lists may be compared and processed such that there are no redundant products in the two or more lists and/or the product of the product detail page does not appear in the list.

Proceeding to the next state, the presentation process identifies recommendations related to at least one community (block 1150). In one embodiment, recommendations related to the community may be generated and stored according to the table generation process discussed above. It is recognized that the recommendations may be grouped by product (e.g., top selling books, top selling videos, top selling DVDs, etc.) and/or the recommendations may be grouped together (e.g., top selling products). Further, the presentation process may combine the recommendations from one or more communities to form one composite list, present one or more composite lists, and/or provide a set of lists.

It is recognized that, in other embodiments, the process may limit the number of lists the top X communities (where X is an integer), combine two or more of the communities to form one community so that there are at most X communities, and so forth. A variety of combinations may be used. The presentation process may then proceed to the next state and add the one or more lists of recommendations to the web page (block 1160). The recommendations may be added as a separate section in the same window, in a separate frame, and/or the recommendations may be placed in their own window (e.g., a pop up window) or in any other type of user interface feature that is well known in the art.

Another embodiment of a presentation process is illustrated in FIG. 12. In FIG. 12, a link to the affiliate-based communities pages (and associated lists of recommendations) is included as part of the product detail page 310.

The presentation process receives a product detail page request (block 1220). Proceeding to the next state, the presentation process retrieves the product detail page (block 1230). The presentation process determines whether the product that corresponds to the product detail page is "featured" in any of the affiliated-based community recommendations lists (block 1240) such as by querying the community recommendations data 768. If the product is featured, the presentation process may add the featured product hyperlink(s) to the web page (block 1250). The featured product hyperlink may be implemented as a URL that, when selected, directs the customer to the web page of the interest group that includes the product in its recommendation list. Proceeding to the next state, the presentation process returns the product detail web page or its corresponding reference (block 1260).

FIG. 3 illustrates a sample product detail page for a book entitled "Raising the Bar: The Championship Years of Tiger Goods." The sample product detail page includes a product hyperlink "Golf Enthusiasts (#3)" 318 informing the customer that this product is #3 in the interest group "Golf Enthusiasts." Upon selection, the product hyperlink takes the customer to the "Golf Enthusiasts" page illustrated in FIG. 4. The sample web page of FIG. 4 includes the book "Raising the Bar: The Championship Years of Tiger Woods" as the third top selling book among members of the Golf Enthusiasts community.

It is recognized that FIG. 11 and FIG. 12 illustrate various embodiments of a presentation process and that other embodiments may be used. For example, the presentation process may combine lists select the "best" list(s), provide the customer access to other lists, and so forth. In addition, the presentation process may also "push" recommendations to affiliate web sites 120 on a periodic basis (e.g., hourly, daily, weekly, etc.) and/or in response to a request for the recommendations. Furthermore, the request may come from the customer computer 110, the affiliate web site 120, as well as a third party.

VI. Additional Embodiments

It is recognized that other types of communities may be automatically formed using other information about the customers, such as for example, activity that evidences a user's interest in a particular item, product, or group of products. For example, one community may be formed by grouping together customers that bought items for a particular charity, customers who participated in the discussion board for a particular group, customers who bid for the same item, and so forth.

VII. Conclusion

Affiliate-based communities enable merchant web sites 130 to create, manage, and track interest-based communities using information about affiliates that refer customers to the merchants. Furthermore, information relating to the referring affiliate may be used to automatically determine customer interests enabling the system to provide targeted and relevant content to unknown or unrecognized customers.

Although this invention has been described in terms of certain embodiments and applications, other embodiments and applications that are apparent to those of ordinary skill in the art, including embodiments which do not provide all of the features and advantages set forth herein, are also within the scope of this invention. Accordingly, the scope of the present invention is intended to be defined only by reference to the appended claims.

APPENDIX

1. Overview

The censored chi-square recommendation algorithm constructs a set of candidate recommendations for a predefined group of customers. It then conducts a statistical hypothesis test to decide whether or not these candidate recommendations are really a result of group preferences which differ from the preferences of the overall customer base. If the conclusion is that group preferences do differ significantly from overall customer preferences, the recommendations are presented to the group.

The inputs to the censored chi-square algorithm are the purchases made by the group (over some time period) and the purchases made by all customers (over the same time period). Other types of events, such as item viewing, downloading and rating events, can additionally or alternatively be used.

The purchases of the entire customer base are used to formulate expectations about how many customers in the group will have purchased each available item, given the total number of purchases by the group. The "group purchase count" for each item is the number of customers in the group who actually purchased the item. The candidate recommendations are first restricted to be those items whose group purchase counts exceeded expectations. Of these candidates, only those items with the largest group purchase counts are then retained. These final candidates are sorted according to how much their group purchase counts exceeded expectations (subject to a normalization). The values used to sort the candidates are called the "residuals".

These residuals form the basis of a test statistic which leads to an estimate of the probability that expectations about the group are the same as expectations about all customers. If this probability is low, it is inferred that the group's preferences are significantly different from the preferences of all customers, and the recommendations are returned as output. If the probability is high, on the other hand, then little evidence exists to suggest the group's preferences differ from overall preferences, so no recommendations are returned.

2. Algorithm for Constructing Censored Chi-Square Recommendations

Let A be the set of customers in the purchase circle (community) under consideration. With respect to the minimum lookback horizon L such that $S\_\{0.99\}$ (defined below) is at least 5:

Define $P=\{<c, i>: c \in A$ and c purchased item i at least once between today and L periods ago$\}$ Let $|P|=n$.

Define $I=\{i:$ there exists a $c \in A$ such that $<c, i> \in P\}$

Define observed counts, expected counts, residuals and standardized residuals as follows:

$o(i)=|\{c:c \in A$ and c purchased i within L$\}|$, $i \in I$ $e(i)=n*phat\_i$, phat_i is the estimated purchase probability for I, $i \in I$ $r(i)=o(i)-e(i)$, $i \in I$ $r\_s(i)=r(i)/sqrt(e(i))$, $i \in I$ Define $I^*\subset I=\{i: i \in I$ and $r(i)>0\}$ Let S be the image of $I^*$ under $o(i)$. Let $|S|=d$.

Let $S\_(1), S\_(2), \ldots, S\_(d)$ be the order statistics of S. thus $S\_(d)$ is the number of distinct customers who purchased the most-purchased (positive-residual) item. Note ties are common, so that a subsequence $S\_(i), S\_(i+1), \ldots, S\_(i+j)$ may have all elements equal.

Let $S\_\{c\}$, $0<=c<=1$, be the cth quantile of S, that is, (100*c) % of the other elements in S are less than or equal to $S\_\{c\}$. Interpolate and break ties as necessary to determine $S\_\{c\}$.

Let SR be the set of standardized residuals which correspond to elements of S that are $>=S\_\{0.99\}$.

Let $|SR|=m$.

Let $SR\_(1), \ldots, SR\_(m)$ be the order statistics of SR.

Call the desired number of recommendations r. Then the order statistic index of the final recommendation candidate is $r^*=\max(m-r+1, 1)$.

Compute $T=\sum\_\{i=r^*\}^m SR\_(i)^2$

Compute the p-value of T, i.e. $Pr(X>T)$ where $X \sim cX^2(n, r^*)$.

If the p-value achieves the desired significance level, then the recommended items for the circle, in order, are $SR\_(m), SR\_(m-1), \ldots, SR\_(r^*+1), SR\_(r^*)$.

3. Estimating the Sampling Distribution of the Censored Chi-Square Statistic

To construct a numerical approximation of the censored chi-square sampling distribution under the null hypothesis, we employ a statistical resampling technique called the bootstrap. The idea is straightforward. We create a group of customers by simple random sampling with replacement from the entire customer base. By construction, the expected purchase allocations of such a group follow the probability model of our null hypothesis. We emphasize that this is simply an algebraic consequence of the method used to fit the null model, and in fact the linearity of expectation guarantees that it holds algebraically regardless of any interdependencies our model ignored in the joint distribution over purchase probabilities.

We then compute the censored chi-square statistic for this random group, as presented above. We can think of the value so obtained as an approximate sample drawn from the censored chi-square's null distribution. By repeatedly (1) constructing a set of customers randomly and (2) computing its censored chi-square statistic, we approximate the so-called empirical distribution of the $cX^2$ under the null hypothesis. Under mild to moderate probabilistic conditions, the empirical distribution converges to the true null distribution of the statistic. Thus an approximate $100(1-\text{alpha})$ % significance level test for circle idiosyncrasy can be conducted by comparing the circle's $cX^2$ statistic value to the (alpha)th quantile of the bootstrapped empirical distribution. Also note that, as a sum of (theoretically) independent random variables, the $cX^2$ sampling distribution should converge asymptotically to the normal distribution as the number of observations over which the statistic is computed grows large. We can determine when application of the normal theory is feasible by testing goodness-of-fit of the bootstrapped distribution to the normal, for example using the Kolmogorov-Smirnoff statistic.

Under the assumptions of the null hypothesis, the value of the $cX^2$ can be shown to grow linearly in the total purchase count of the circle (community) as well as the number of items to recommend (i.e. terms in the $cX^2$ summation). Since the purchase probabilities are constants under the null hypothesis, these are the only two variables with which the $cX^2$ grows. So in theory we would want to bootstrap a distribution for each possible $<n, r>$ pair, where n is the circle's purchase count and r the number of recommended items. In practice, both n and r are random variables which depend on the particular set of random customers we assemble at each iteration of the bootstrap. So we bootstrap various random group sizes at various lookback horizons, then recover the sampling distributions from the $<n, r>$ values implicitly obtained in the course of each iteration. We can then construct approximate empirical distributions for $<n, r>$ intervals which are large enough to contain enough observations for us to get useful convergence to the true null distribution. With these parameterized approximate sampling distributions available, we conduct a hypothesis test using the sampling distribution whose $<n, r>$ interval contains the values of n and r actually obtained for the circle being tested.

IV. Determination of Optimal Lookback Horizon

Before testing the hypothesis that a particular purchase circle follows the probability model to allocate its purchases across items, we decide how much of the circle's available transaction data to use in computing the censored chi-square test statistic. We choose to utilize data looking sequentially backwards in time, without weighting observations. Thus the question of how much data to use is equivalent for our purposes to asking how many prior days of data to include in the computation. We refer to this number of days as the lookback horizon associated with the purchase circle.

In general, the power of a test statistic (the probability the test statistic will detect deviations from the null hypothesis) is a nondecreasing function of the amount of data provided, so using all available data normally won't harm our statistical inferences. There are other drawbacks in our situation, however. First, the stationarity assumption behind the purchase probability estimates is at best only locally correct. The further back in time we look, the more likely it is that nonstationarity in the purchase probabilities will manifest itself in our hypothesis tests. Since this nonstationarity impacts the bootstrap as well, it is actually a pervasive problem that can't be circumvented with simple resampling, and it will tend to cause us to detect circle idiosyncrasies where none actually exist.

Second, without researching the power function of the censored chi-square, we cannot make any statements about the expected power benefits of incrementally larger datasets. In light of this, it makes sense to let computational efficiency dictate the sizes of the datasets used in hypothesis testing. In other words, knowing nothing about the relative value of larger datasets, we will use the smallest dataset which allows a given purchase circle to satisfy the reasonability criterion. Currently this means that the observed count for the 99th percentile of the circle's positive-residual items, ranked by observed count, must be at least 5.

Determining the minimum lookback horizon consistent with this constraint would in general require repeated computations at successively longer horizons for a particular circle. Instead, for computational efficiency, we will forecast a horizon that has high probability of satisfying the constraint, accepting that in expectation some small percentage of circles will fail to satisfy it. The forecast is produced as a side effect of the bootstrap computation (see above). Each random group size we bootstrap over will have iterations at many horizons. At each horizon, some fraction of the iterations will fail the reasonability criterion. We record all such failures. Roughly speaking, the fraction of failures should decrease as lookback horizon increases. Given a purchase circle whose minimum lookback horizon we want to forecast, we find the bootstrap group size it is close to, then pick the shortest horizon which had an acceptable failure rate. If no bootstrapped horizon had an acceptably low rate, we choose the longest horizon and accept that many idiosyncratic circles of that size will escape detection by failing the reasonability criterion.

What is claimed is:

1. A method for selecting items to recommend to users, the method comprising:
    tracking referrals of users from each of a plurality of referring sites to a target site, said referrals resulting from user selections of links provided on the referring sites;
    collecting user activity data regarding item-specific user actions performed on the target site, said item-specific user actions reflective of user preferences for particular items represented on the target site; and
    selecting, by execution of code by a computer system, a subset of said items to recommend to users of a first referring site of said plurality of referring sites, wherein selecting the subset of items comprises analyzing the collected user activity data, in conjunction with data regarding the tracked referrals, to identify items that are more popular among users referred from the first referring site than among a general user population of the target site.

2. The method of claim 1, wherein the items are products represented in an electronic product catalog hosted by the target site.

3. The method of claim 2, wherein the user activity data comprises data representing user purchases of particular products represented in the electronic catalog.

4. The method of claim 1, wherein the items are electronic content items that are retrievable from the target site.

5. The method of claim 1, wherein the referring sites are affiliate sites that participate in an affiliate marketing program of the target site.

6. The method of claim 5, wherein the method comprises assigning at least some of the users of the target site to affiliate-based communities based on the affiliate sites that referred such users to the target site, and identifying, for each affiliate-based community, items that are significantly more popular among members of the respective affiliate-based community than among a general user population of the target site.

7. The method of claim 1, further comprising causing the subset of items to be recommended to an unknown or unrecognized user of the first referring site.

8. The method of claim 1, further comprising, when an unknown or unrecognized user is referred from the first referring site to the target site, causing the subset of items to be recommended to the unknown or unrecognized user.

9. A system for selecting items to recommend to users, the system comprising:
    a computer data repository that stores referral data identifying, for each of a plurality of users of a target site, which of a plurality of referring sites referred the respective user to the target site; and
    a computer data repository that stores user activity data identifying item-specific actions performed by users on the target site, said item-specific user actions reflective of user preferences for particular items represented on the target site; and
    a computer system programmed to select a subset of said items to recommend to users of a first referring site of said plurality of referring sites, said computer system programmed to select the subset of items at least partly by analyzing the user activity data, in conjunction with the referral data, to identify items that are more popular among users referred from the first referring site than among a general user population of the target site.

10. The system of claim 9, wherein the items are products represented in an electronic catalog hosted by the target site.

11. The system of claim 10, wherein the user activity data comprises data representing user purchases of particular products represented in the electronic catalog.

12. The system of claim 9, wherein the items are electronic content items that are viewable on the target site.

13. The system of claim 9, wherein the referring sites are affiliate sites that participate in an affiliate marketing program associated with the target site.

14. The system of claim 13, wherein the computer system is programmed to assign users of the target site to communities based on the affiliate sites that referred such users to the target site, and to identify, for each community, items that more popular among members of the respective community than among a general user population of the target site.

15. The system of claim 9, wherein the computer system is programmed to cause the subset of items to be recommended to an unknown or unrecognized user of the first referring site.

16. The system of claim 15, wherein the computer system is programmed to cause the subset of items to be recommended to the unknown or unrecognized user when the unknown or unrecognized user is referred from the first referring site to the target site.

17. A computer implemented method, comprising:
    receiving, at a server of a target site, a page request from a computing device of an unknown or unrecognized user, said page request resulting from selection by the user of a referral link on a referring site, said page request including an identifier of the referring site; and
    selecting a set of items to present to the unknown or unrecognized user in response to the page request, said set of items selected by the server based on the identifier of the referring site, said set of items consisting of items that are more popular among users referred from the referring site than among a general user population of the target site, as determined based on a programmatic analysis of actions performed on the target site by users referred from the referring site and by users not referred from the target site.

18. The method of claim 17, wherein the referring site is an affiliate site that participates in an affiliates program of the target site.

19. The method of claim 18, wherein the items are products represented in an electronic catalog of the target site.

20. The method of claim 18, further comprising, by execution of code by a computer system, performing said programmatic analysis of actions performed on the target site to identify said set of items.

* * * * *